US012305324B2

(12) United States Patent
Kim et al.

(10) Patent No.: US 12,305,324 B2
(45) Date of Patent: May 20, 2025

(54) CLOTHING CLASSIFICATION APPARATUS AND CLOTHING ORGANIZING APPARATUS INCLUDING SAME

(71) Applicant: SAMSUNG ELECTRONICS CO., LTD., Suwon-si (KR)

(72) Inventors: Daesoo Kim, Suwon-si (KR); Youngjae Chae, Suwon-si (KR); Jaehong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 27 days.

(21) Appl. No.: 18/136,599

(22) Filed: Apr. 19, 2023

(65) Prior Publication Data

US 2023/0257928 A1 Aug. 17, 2023

Related U.S. Application Data

(63) Continuation of application No. PCT/KR2021/013230, filed on Sep. 28, 2021.

(30) Foreign Application Priority Data

Oct. 22, 2020 (KR) .................. 10-2020-0137357

(51) Int. Cl.
*D06F 89/02* (2006.01)
*D06F 89/00* (2006.01)
*B25J 15/00* (2006.01)

(52) U.S. Cl.
CPC .............. *D06F 89/02* (2013.01); *D06F 89/00* (2013.01); *B25J 15/0052* (2013.01)

(58) Field of Classification Search
CPC ........ D06F 89/00; D06F 89/02; D06F 89/023; B25J 9/1682; B25J 11/008; B65B 63/045; A41H 43/0257

(Continued)

(56) References Cited

U.S. PATENT DOCUMENTS 3,148,807 A * 9/1964 Freeman ................. D06F 89/00
                                                                 223/37
3,167,223 A * 1/1965 Weiss ...................... D06F 89/02
                                                                 223/37

(Continued)

FOREIGN PATENT DOCUMENTS

JP           9-85184 A      3/1997
JP      2013-226408 A     11/2013

(Continued)

OTHER PUBLICATIONS

Communication issued Dec. 22, 2023 by the European Patent Office in European Patent Application No. 21883037.0.

(Continued)

*Primary Examiner* — Shaun R Hurley
(74) *Attorney, Agent, or Firm* — Sughrue Mion, PLLC

(57) ABSTRACT

A clothing classification apparatus includes: a first roller; a second roller arranged to face the first roller; a driving device rotating the first and second rollers in different directions; sensors for sensing positions of clothes in each of the upper and lower areas of the first and second rollers; and a processor configured to control the driving device so that the clothes repeatedly move between the first and second rollers a predetermined number of times when the clothes are placed on the first and second rollers, and control the driving device to change the rotational directions of the first and second rollers when it is confirmed that the clothes pass through the upper or lower area on the basis of results of the sensing by the sensors.

10 Claims, 35 Drawing Sheets

(58) Field of Classification Search
USPC .......................................................... 223/37
See application file for complete search history.

(56) References Cited

U.S. PATENT DOCUMENTS

| | | | |
|---|---|---|---|
| 11,225,753 | B2 | 1/2022 | Naor et al. |
| 2006/0130243 | A1 | 6/2006 | Ozaltin et al. |
| 2010/0026989 | A1 | 2/2010 | Wildenbeest et al. |
| 2016/0145055 | A1 | 5/2016 | Sielermann et al. |
| 2019/0345664 | A1 | 11/2019 | Bringewatt et al. |
| 2019/0390396 | A1 | 12/2019 | Kwak |

FOREIGN PATENT DOCUMENTS

| | | | | |
|---|---|---|---|---|
| JP | 2019-92999 | A | | 6/2019 |
| JP | 2019-198490 | A | | 11/2019 |
| KR | 10-1983-0003349 | A | | 6/1983 |
| KR | 10-2002-0005058 | A | | 1/2002 |
| KR | 10-2012-0033610 | A | | 4/2012 |
| KR | 10-1874502 | B1 | | 7/2018 |
| KR | 10-1921858 | B1 | | 2/2019 |
| KR | 10-2019-0090743 | A | | 8/2019 |
| WO | WO-2012046227 | A1 | * 4/2012 | ............. D06F 89/00 |
| WO | WO-2019038752 | A1 | * 2/2019 | ............. D06F 89/00 |
| WO | WO-2019242595 | A1 | * 12/2019 | ............. D06F 89/02 |
| WO | WO-2020003127 | A1 | * 1/2020 | ............. B25J 13/086 |

OTHER PUBLICATIONS

International Search Report (PCT/ISA/210) issued by the International Searching Authority on Jan. 20, 2022 in International Application No. PCT/KR2021/013230.
Written Opinion (PCT/ISA/237) issued by the International Searching Authority on Jan. 20, 2022 in International Application No. PCT/KR2021/013230.

* cited by examiner

CLOTHING CLASSIFICATION APPARATUS AND CLOTHING ORGANIZING APPARATUS INCLUDING SAME

CROSS-REFERENCE TO RELATED APPLICATIONS

This application is a by-pass continuation of International Application No. PCT/KR2021/013230, filed on Sep. 28, 2021, which is based on and claims priority to Korean Patent Application No. 10-2020-0137357, filed on Oct. 15, 2021, in the Korean Intellectual Property Office, the disclosures of which are incorporated by reference herein in their entireties.

BACKGROUND

1. Field

The disclosure relates to a clothing classification apparatus and a clothing organizing apparatus including the same, and more particularly, to a clothing classification apparatus having an improved structure capable of easily folding clothing by quickly inducing an initial grip point of the clothing, and a clothing organizing device including the same.

2. Description of Related Art

With the development of electronic technology, various electronic devices have been developed. In particular, recently, various robot devices capable of performing household chores in place of humans have been developed. Especially, as washing machines and dryers are widely used by users, many of clothing-related household chores are performed by robot devices.

However, it is still inconvenient for users to manually fold dried clothing into a specific shape. Accordingly, there is a growing need for a robot device to perform a process of organizing dried clothing.

SUMMARY

Provided are a clothing classification apparatus having an improved structure capable of easily folding clothing by quickly inducing an initial grip point of the clothing, and a clothing organizing device including the same.

According to an aspect of the disclosure, a clothing classification apparatus includes: a first roller; a second roller facing the first roller; at least one driving device configured to rotate the first roller and the second roller in different directions; a plurality of sensors configured to acquire location information of a piece of clothing relative to the first roller and the second roller; and at least one processor configured to: control the at least one driving device to move the piece of clothing between the first roller and the second roller a predetermined number of times, identify, based on the location information acquired by the plurality of sensors, the piece of clothing passes through either a region above the first roller and the second roller or a region below the first roller and the second roller, and based on identifying that the piece of clothing passes through either the region above the first roller and the second roller or the region below the first roller and the second roller, control the at least one driving device to change a rotation direction of each of the first roller and the second roller.

The clothing classification apparatus may further include a pressing member connecting the first roller and the second roller to each other and pressing the first roller and the second roller toward each other.

The clothing classification apparatus may further include a first sidewall and a second sidewall that are disposed on opposing ends of the first roller and the second roller and rotatably support the first roller and the second roller, and each of the first sidewall and the second sidewall may include a guide slot that receives a respective end of the second roller and may be configured to guide a movement path of the second roller.

The at least one processor may be further configured to, based on identifying that the piece of clothing has been moved between the first roller and the second roller the predetermined number of times and identifying, based on the location information acquired by the plurality of sensors, the piece of clothing occupies a predetermined portion of the region above the first roller and the second roller, control the at least one driving device to drop the piece of clothing into the region below the first roller and the second roller.

The plurality of sensors may include: a first sensor configured to detect a location of the piece of clothing in the region above the first roller and the second roller; and a second sensor configured to detect a location of the piece of clothing in the region below the first roller and the second roller, and the first sensor and the second sensor are disposed along a length direction of the first roller and the second roller.

According to an aspect of the disclosure, a clothing organizing apparatus includes: at least one grip device configured to grip and move a piece of clothing; a clothing classification apparatus including a first roller and a second roller facing the first roller, the first roller and the second roller being configured to move the piece of clothing upward or downward between the first roller and the second roller; a folding device including a plurality of rotatable plates configured to fold the piece of clothing; and at least one processor configured to: control the at least one grip device to move the piece of clothing to the clothing classification apparatus, control the clothing classification apparatus to classify the piece of clothing moved to the clothing classification apparatus, control the at least one grip device to move the piece of clothing classified by the clothing classification apparatus to the folding device, and control the folding device to fold the piece of clothing placed on the folding device.

The at least one grip device may include a first grip device and a second grip device that are configured to grip different regions of the piece of clothing, and the at least one processor may be further configured to, based on the first grip device gripping the piece of clothing classified by the clothing classification apparatus, control the second grip device to grip a lowermost region of the piece of clothing gripped by the first grip device.

The clothing organizing apparatus may further include a camera configured to capture an image of the piece of clothing gripped by the first grip device and the second grip device.

The at least one processor may be further configured to: identify a predetermined region of the piece of clothing gripped by the at least one grip device, based on the image captured by the camera, and control the at least one grip device to place the predetermined region of the piece of clothing at a predetermined position of the folding device.

The at least one processor may be further configured to: control the at least one grip device to re-grip a region of the piece of clothing adjacent to the predetermined region of the piece of clothing placed on the folding device, and place the re-gripped piece of clothing in a predetermined shape on the folding device.

The at least one processor may be further configured to, based on the at least one processor not identifying the predetermined region of the gripped clothing based on the image captured by the camera, control the at least one grip device to move the gripped clothing to a predetermined point in the clothing organizing apparatus.

The plurality of rotatable plates include: a main plate disposed horizontally; a first folding plate rotatably connected to a left side of the main plate; a second folding plate rotatably connected to a right side of the main plate; and a third folding plate rotatably connected to a front side of the main plate.

The first folding plate may be bent upward at a left end thereof, and the second folding plate may be bent upward at a right end thereof.

The clothing organizing apparatus may further include a guide rail disposed vertically within the clothing organizing apparatus, and the main plate may be rotatably connected to the guide rail on a horizontal plane.

The folding device may further include an auxiliary plate connected to the main plate and configured to be movable upward or downward.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

It should be understood that embodiments to be described below are examples provided to help the understanding of the disclosure, and the disclosure may be modified in various ways. Further, the accompanying drawings are not necessarily illustrated to actual scale but dimensions of some components may be exaggerated to help the understanding of the disclosure.

The terms used in the specification and the claims are general terms selected in consideration of functions in the disclosure. However, these terms may vary depending on intentions of those skilled in the art, legal or technical interpretation, emergence of new technologies, and the like. Also, some terms may be arbitrarily selected by the applicant. These terms may be construed as meanings defined in the specification, and may be construed based on the entire text of the specification and the common technical knowledge in the art unless specifically defined.

In the specification, the expressions "have", "may have", "include", "may include", and the like indicate the presence of stated features (e.g., numbers, functions, operations, or components such as parts), but do not preclude the presence of additional features.

In addition, in the specification, components required for describing each embodiment of the disclosure are described, and the components are not necessarily limited thereto. Therefore, some components may be changed or omitted and other components may be added. In addition, components may be arranged in different independent devices in a distributed manner.

Furthermore, embodiments of the disclosure will hereinafter be described in detail with reference to the accompanying drawings and contents described in the accompanying drawings, but the disclosure is not limited or restricted by the embodiments.

Hereinafter, the disclosure will be described in more detail with reference to the accompanying drawings.

Figure 1:
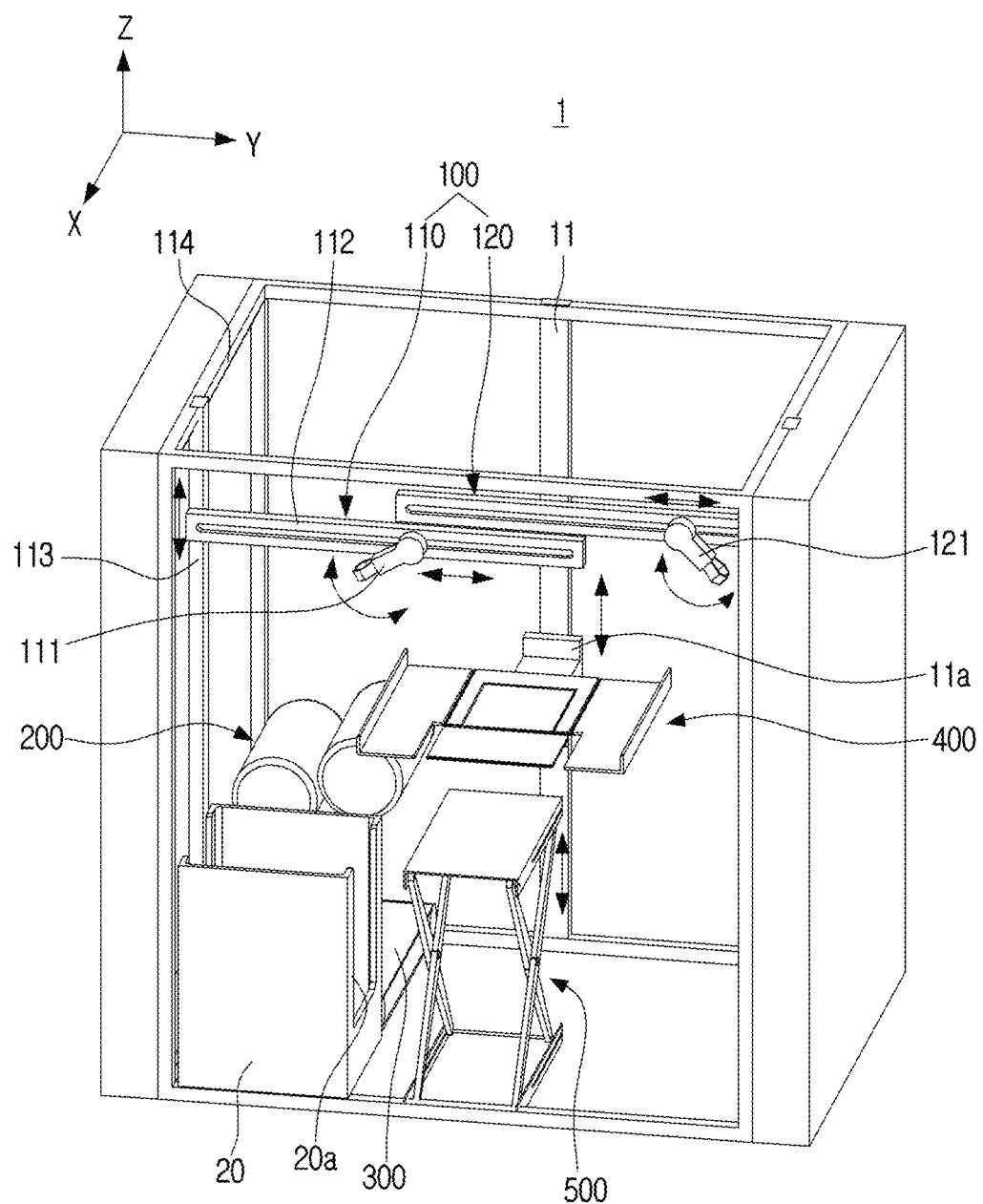
FIG. 1 is a perspective view of a clothing organizing apparatus according to an embodiment of the disclosure.
Figure 2:
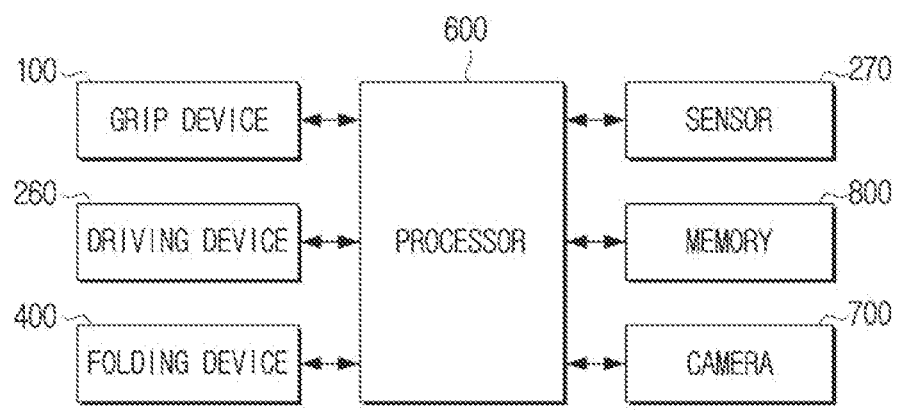
FIG. 2 is a block diagram for explaining the clothing organizing apparatus according to an embodiment of the disclosure.

FIG. 1 is a perspective view of a clothing organizing apparatus according to an embodiment of the disclosure. FIG. 2 is a block diagram for explaining the clothing organizing apparatus according to an embodiment of the disclosure.

Referring to FIGS. 1 and 2, a clothing organizing apparatus 1 according to an embodiment of the disclosure may include at least one grip device 100, a clothing classification apparatus 200, a moving device 300, and a folding device 400, a discharge plate 500, a processor 600, a camera 700, and a memory 800.

The at least one grip device 100 may grip and move clothing. The grip device 100 may include a first grip device 110 and a second grip device 120 having a structure symmetric to each other.

The first grip device 110 may include a first gripper 111 and first to third rails 112, 113, and 114.

The first rail 112 may be disposed horizontally along a Y-axis direction, and one end of the first rail 112 may be connected to the second rail 113 disposed vertically. The second rail 113 may be connected to the third rail 114 disposed horizontally along an X-axis direction. The first rail 112 may vertically move upward and downward along the second rail 113, and the second rail 113 may move in the X-axis direction along the third rail 114.

The first gripper 111 may be rotatably connected to the first rail 112 on an X-Y plane, and move in the Y-axis direction along the first rail 112. That is, according to the movement of the first and second rails 112 and 113 and the movement and rotation of the first gripper 111, the first gripper 111, which has three linear degrees of freedom (X-axis, Y-axis, and Z-axis) orthogonal to each other and a rotational degree of freedom in one direction, may easily perform a clothing gripping operation at any point in the clothing organizing apparatus 1.

However, the structure of the first grip device 110 is not limited thereto, and may be formed in various ways as long as the first gripper 111 has the above-described degrees of freedom.

The second grip device 120 may have a structure symmetric to the first grip device 110 with respect to an X-Z plane. That is, like the first gripper 111, a second gripper 121 of the second grip device 120 may freely move to any point within the clothing organizing apparatus 1.

The first and second grippers 111 and 121 may grip different regions of clothing, and may rotate the clothing by moving to cross each other if necessary.

The first gripper 111 may grip an uppermost one of a plurality of pieces of clothing accommodated in a clothing box 20 and move the gripped piece of clothing to the clothing classification apparatus 200. A groove 20a may be formed in one side of the clothing box 20. Accordingly, the first rail 112 may easily grip the clothing stored in the clothing box 20 without interfering with the clothing box 20.

The clothing classification apparatus 200 may include two rollers disposed to face each other to move clothing disposed between the two rollers upward or downward. The clothing classification apparatus 200 may further include a driving device 260 rotating the rollers and sensors 270 detecting a location of the clothing disposed between the two rollers.

The processor 600 may control the driving device 260 according to a predetermined algorithm based on sensing results of the sensors 270. A structure of the clothing classification apparatus 200 and a process of controlling the clothing classification apparatus 200 will be described in detail below.

When the clothing is placed on upper sides of the two rollers by the first gripper 111, an initial grip point of the clothing may be induced as the rollers rotate, and the clothing may be classified by leaving one of a plurality of tangled pieces of clothing and bringing the other pieces of clothing to drop downward. A specific structure of the clothing classification apparatus 200 will be described in detail below with reference to FIGS. 3 to 5.

The moving device 300 may be disposed below the clothing classification apparatus 200 to move the clothing that has dropped from the clothing classification apparatus 200 to a predetermined point. The moving device 300 may be implemented by a conveyor belt rotated by the two rollers, but is not limited thereto, and any type of device may be used as long as it is capable of moving clothing.

The folding device 400 may include a plurality of rotatable plates to fold clothing provided in a predetermined shape by the grip device 100.

The folding device 400 may be movable upward or downward along a guide rail 11 disposed vertically. Accordingly, the folding device 400 may avoid interference with the grip device 100 that is movable inside the clothing organizing apparatus 1.

The folding device 400 may be rotatably connected to the guide rail 11 through a connection member 11a. Specifically, the connection member 11a may connect a bottom surface of the folding device 400 and the guide rail 11, and be rotated on a horizontal plane (X-Y plane) by a motor.

Accordingly, the folding device 400 may move upward or downward along a Z-axis direction and rotate on the horizontal plane at the same time. A specific structure of the folding device 400 will be described in detail below with reference to FIGS. 14 to 16.

The discharge plate 500 may be disposed horizontally to allow clothing folded by the folding device 400 to be placed thereon. The discharge plate 500 may move upward or downward because its bottom surface is supported by X-shaped links. Accordingly, the clothing folded by the folding device 400 may be easily placed on the discharge plate 500 that may have various heights.

The processor 600 may control overall operations of the clothing organizing apparatus 1. To this end, the processor 600 may include a central processing unit (CPU) or an application processor (AP). Alternatively, the processor 600 may be implemented by at least one general processor, digital signal processor, application specific integrated circuit (ASIC), system on chip (SoC), microcomputer (MICOM), driver IC, or the like.

The processor 600 may control the grip device 100 to move clothing from the clothing box 20 to the clothing classification apparatus 200, control the grip device 100 to move the clothing classified by the clothing classification apparatus 200 to the folding device 400, and control the folding device 400 to fold the clothing placed on the folding device 400.

The camera 700 may capture an image of clothing gripped by the grip device 100. For example, the camera 700 may be implemented by a 3D camera or a depth camera.

The memory 800 may store an operating system (OS) for controlling overall operations of components of the clothing organizing apparatus 1 and commands or data related to components of the memory 800.

Accordingly, the processor 600 may control a plurality of hardware or software components of the clothing organizing apparatus 1 using the various commands or data stored in the memory 800, and may load commands or data received from at least one of the other components into a volatile memory for processing, and store various types of data in a non-volatile memory.

The processor 600 may receive information regarding a shape and a location of clothing detected by the camera 700 and the sensors 270 of the clothing classification apparatus 200, and analyze the received information to determine the location, the size, the shape, and the type of the clothing. Specifically, the processor 600 may determine the size, the shape, the type, and the like of the clothing by recognizing the clothing through a clothing recognition algorithm, and determine the location of the clothing based on clothing depth information.

A process of controlling the clothing organizing apparatus 1 through the sensors 270 of the clothing classification apparatus 200 and the camera 700 will be described in detail below.

Figure 3:
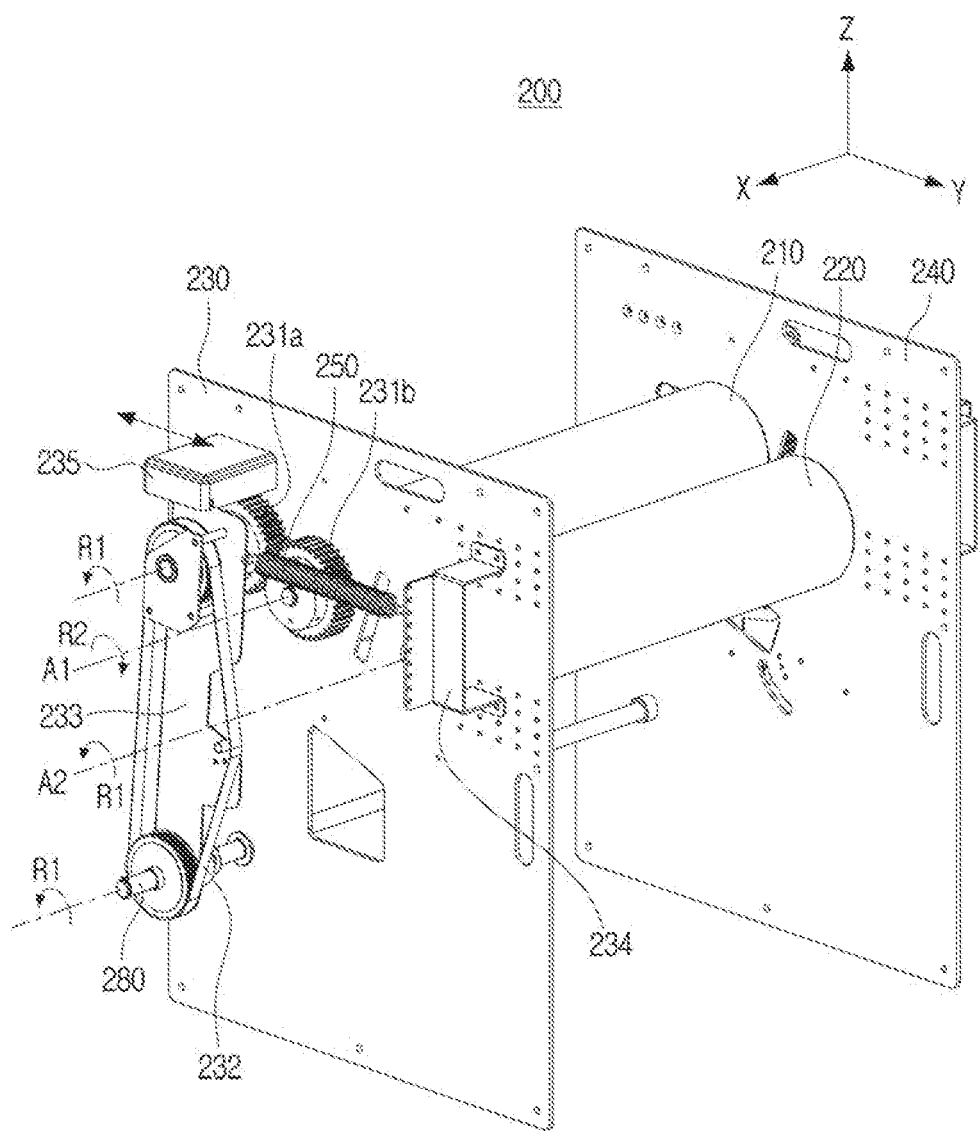
FIG. 3 is a perspective view of the clothing classification apparatus according to an embodiment of the disclosure when viewed from one side.
Figure 4:
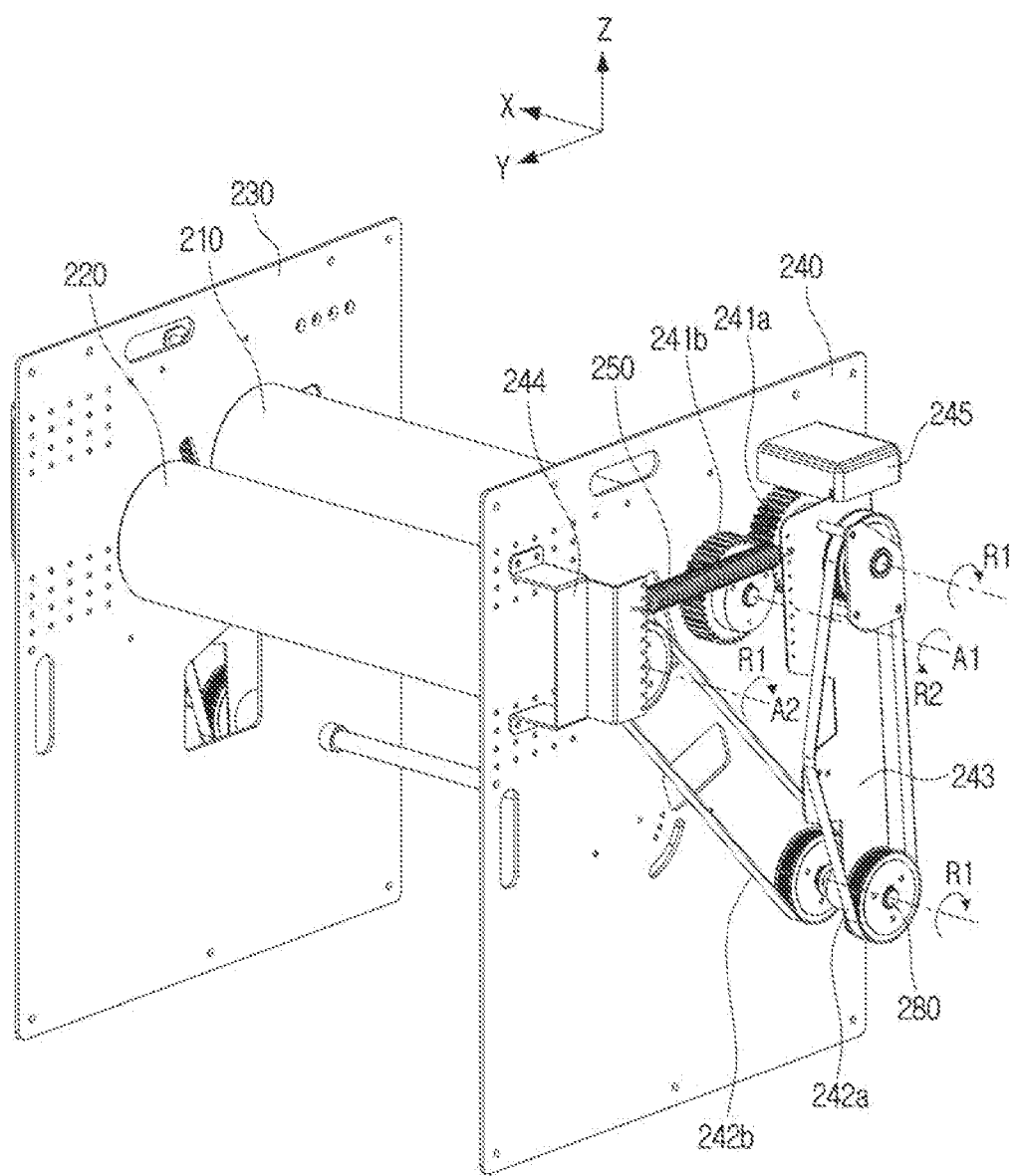
FIG. 4 is a perspective view of the clothing classification apparatus according to an embodiment of the disclosure when viewed from the opposite side.
Figure 5:
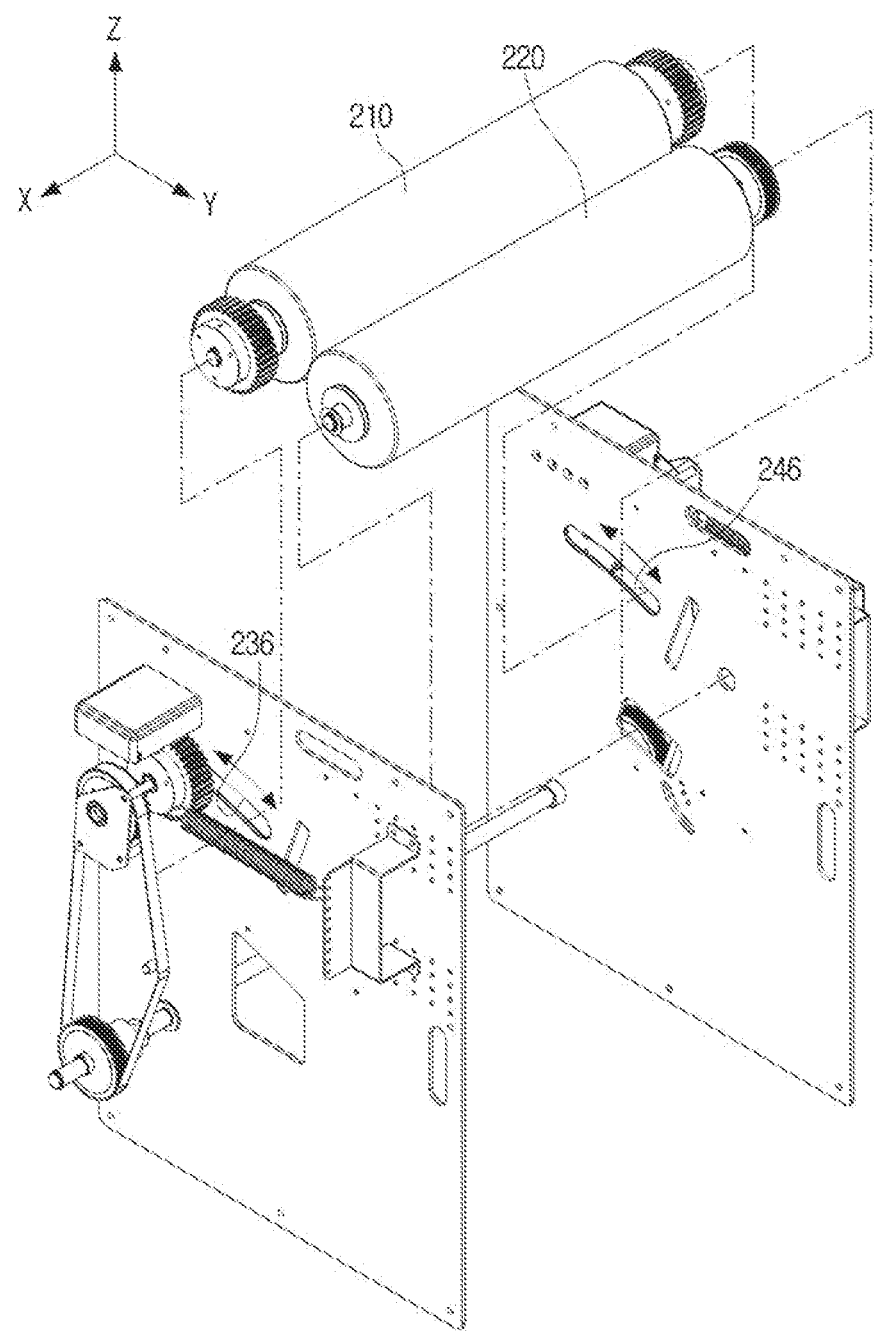
FIG. 5 is an exploded perspective view illustrating a state in which first and second rollers are separated from first and second sidewalls.

FIG. 3 is a perspective view of the clothing classification apparatus according to an embodiment of the disclosure when viewed from one side. FIG. 4 is a perspective view of the clothing classification apparatus according to an embodiment of the disclosure when viewed from the opposite side. FIG. 5 is an exploded perspective view illustrating a state in which first and second rollers are separated from first and second sidewalls.

Referring to FIGS. 3 to 5, the clothing classification apparatus 200 may include a first roller 210, a second roller 220, a first sidewall 230, a second sidewall 240, a pressing member 250, and a shaft 280.

The first and second rollers 210 and 220 may be disposed to face each other and rotate in different directions. The first and second sidewalls 230 and 240 may be disposed at both ends of the first and second rollers 210 and 220, respectively, to rotatably support the first and second rollers 210 and 220.

Specifically, when the driving device 260 of the clothing classification apparatus 200 rotates the shaft 280 inserted into the first and second sidewalls 230 and 240 in an R1 direction, a first gear 231a connected to the shaft 280 may also be rotated in the R1 direction by a belt 232. A second gear 231b may be disposed to be engaged with the first gear 231a and rotate in an R2 direction contrary to the first gear 231a, and accordingly, the second roller 220 may rotate in the R2 direction about an A1 axis.

In addition, as illustrated in FIG. 4, as the shaft 280 rotates in the R1 direction, a third gear 241a may also be rotated in the R1 direction by a belt 242a connecting the shaft 280 and the third gear 241a to each other. A fourth gear 241b engaged with the third gear 241a may rotate in the R2 direction, and accordingly, the first roller 210 may rotate in the R2 direction about the A1 axis.

Meanwhile, the second roller 220 may be rotated in the R1 direction about an A2 axis by a belt 242b connecting the shaft 280 and the first roller 210 to each other. That is, as the shaft 280 rotates, the first and second rollers 210 and 220 may rotate in opposite directions, while the plurality of belts, gears, and pulleys disposed on rear surfaces of the first and second sidewalls 230 and 240 operate in conjunction with each other.

In addition, by rotating the shaft 280 using one drive source without having to provide separate drive sources for the respective rollers to rotate the first and second rollers 210 and 220, the first and second rollers 210 and 220 may be stably rotated in a mutually synchronized state.

Both ends of the first roller 210 may be inserted into guide slots 236 and 246 formed in the first and second sidewalls 230 and 240, respectively. The guide slots 236 and 246 may guide a movement path of the first roller 210.

Specifically, when clothing is disposed between the first and second rollers 210 and 220, the first roller 210 may be spaced apart from the second roller 220 along the guide slots 236 and 246, and accordingly, the clothing may be easily moved between the first and second rollers 210 and 220.

The pressing member 250 may connect the first and second rollers 210 and 220 to each other to press the first roller 210 toward the second roller 220. For example, two pressing members 250 may be formed, one being disposed on the rear surface of the first sidewall 230 to connect one end of the first roller 210 and one end of the second roller 220 to each other, and the other being disposed on the rear surface of the second sidewall 240 to connect the other end of the first roller 210 and the other end of the second roller 220 to each other.

Specifically, the pressing member 250 disposed on the rear surface of the first sidewall 230 may connect a first plate 233 through which a shaft of the first gear 231a is fitted and a fixing member 234 fixed onto the rear surface of the first sidewall 230, and the pressing member 250 disposed on the rear surface of the second sidewall 240 may connect a second plate 243 through which a shaft of the third gear 241a is fitted and a fixing member 244 fixed onto the rear surface of the second sidewall 240.

The first and second plates 233 and 243 may move in the same direction as the first roller 210 because upper portions of first and second plates 233 and 243 are inserted into slots formed in guide members 235 and 245, respectively.

Accordingly, when clothing moves between the first and second rollers 210 and 220, the clothing may be pressed by the first roller 210, so that the clothing is unwrinkled by the first and second rollers 210 and 220, and the clothing is prevented from unintentionally dropping downward the first and second rollers 210 and 220.

FIGS. 6A to 6E are views for explaining a process in which the clothing classification apparatus is operated to induce an initial grip point of clothing.

Figure 6A:
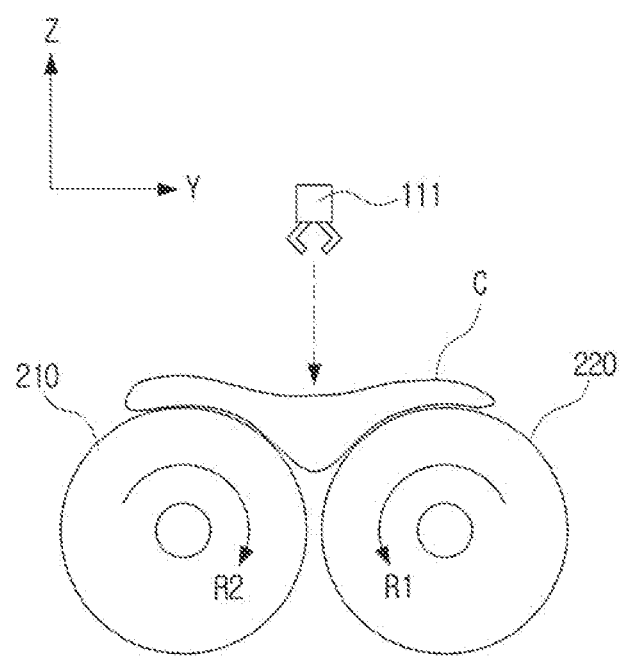
FIGS. 6A to 6E are views for explaining a process in which the clothing classification apparatus is operated to induce an initial grip point of clothing.

Referring to FIG. 6A, when the first gripper 111 places clothing C on the upper sides of the first and second rollers 210 and 220, the first roller 210 may rotate in the R2 direction and the second roller 220 may rotate in the R1 direction. Accordingly, the clothing C may move downward between the first and second rollers 210 and 220.

Figure 6B:
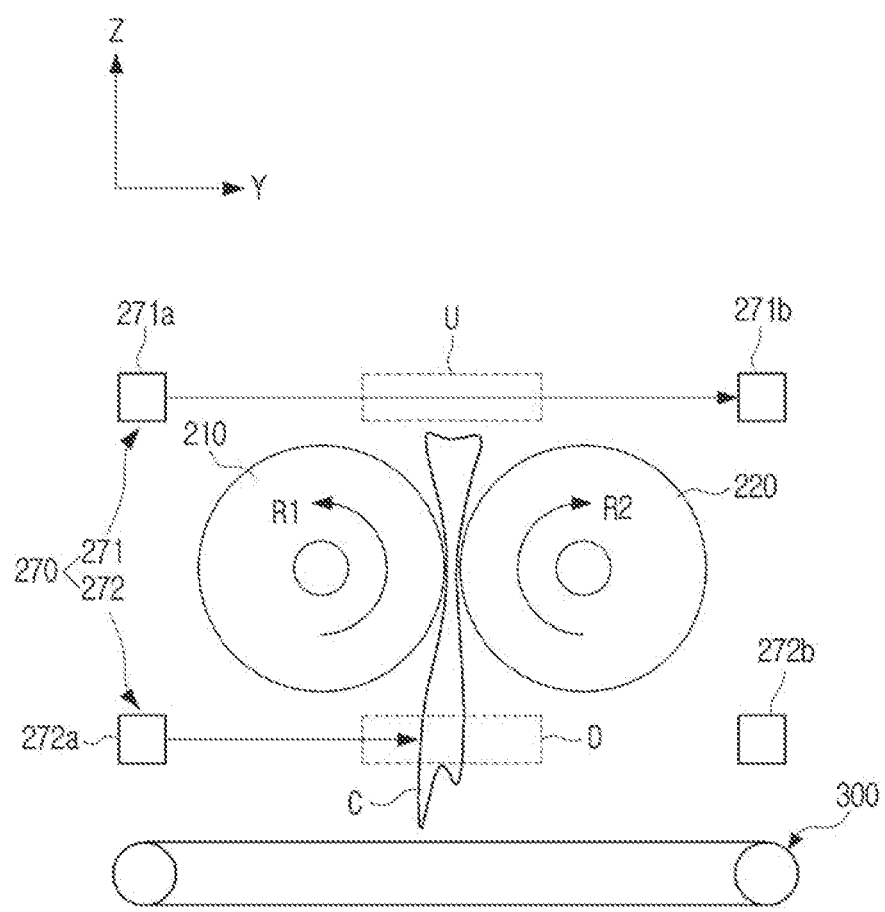

Referring to FIG. 6B, the clothing classification apparatus 200 according to an embodiment of the disclosure may include sensors 270 detecting a location of the clothing in an upward region U and a downward region D, respectively, of the first and second rollers 210 and 220.

The upward region U may be located above the first and second rollers 210 and 220 and adjacent to the first and second rollers 210 and 220. The downward region D may be located below the first and second rollers 210 and 220 and adjacent to the first and second rollers 210 and 220. In the upward and downward regions U and D, the sensors 270 may be disposed at positions to detect a location of the clothing C.

Specifically, the sensors 270 may include a first sensor 271 detecting a location of the clothing C in the upward region U and a second sensor 272 detecting a location of the clothing C in the downward region D.

The first and second sensors 271 and 272 may be disposed along a length direction of the first and second rollers 210 and 220. The first and second sensors 271 and 272 may be implemented by light sensors including light emitting units 271a and 272a and light receiving units 271b and 272b, respectively.

For example, when the light receiving units 271b and 272b fail to receive light emitted from the corresponding light emitting units 271a and 272a of the sensors 270, the processor 600 may determine that the clothing is located between the light emitting units 271a and 272a and the light receiving units 271b and 272b.

Conversely, when the light receiving units 271b and 272b receive light emitted from the corresponding light emitting units 271a and 272a of the sensors 270, the processor 600 may determine that the clothing is not located between the light emitting units 271a and 272a and the light receiving units 271b and 272b.

As illustrated in FIG. 6B, when it is determined that the clothing C is not located in the upward region U because the light receiving unit 271b of the first sensor 271 receives light emitted from the light emitting unit 271a of the first sensor 271, the processor 600 may control the driving device 260 to change the rotation directions of the first and second rollers 210 and 220.

Accordingly, the first roller 210 may rotate in the R1 direction, and the second roller 220 may rotate in the R2 direction, so that the clothing C disposed therebetween moves upward by changing its moving direction.

Figure 6C:
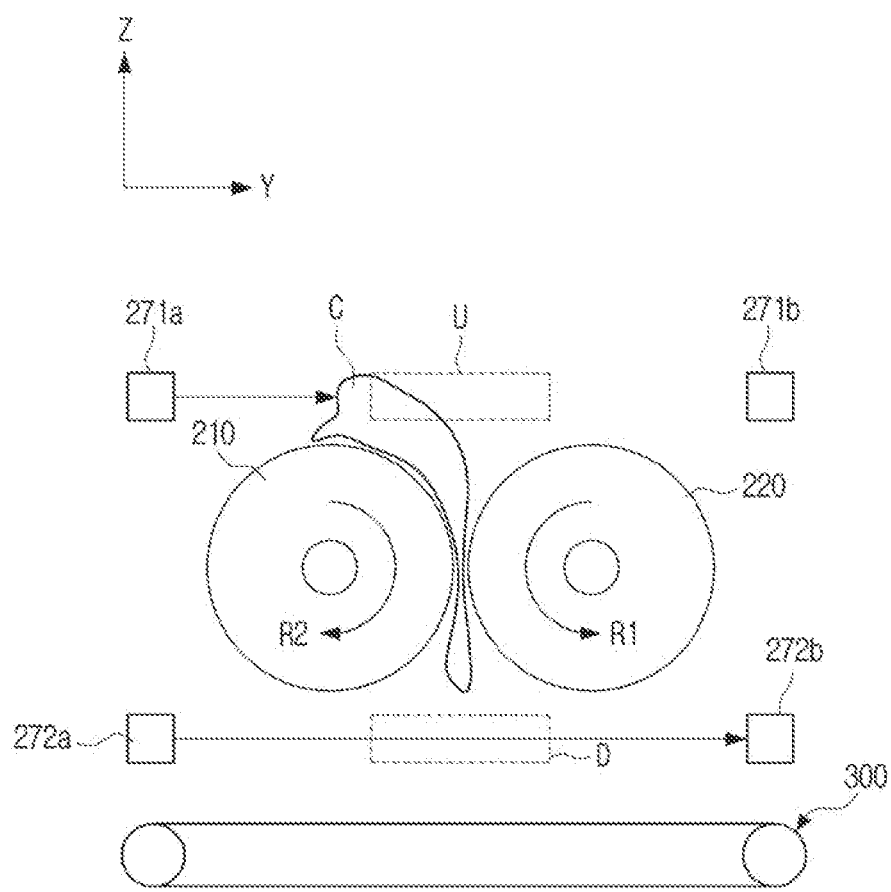

Similarly, as illustrated in FIG. 6C, when it is determined that the clothing C is not located in the downward region D because the light receiving unit 272b of the second sensor 272 receives light emitted from the light emitting unit 272a of the second sensor 272, the processor 600 may control the driving device 260 to change the rotation directions of the first and second rollers 210 and 220.

Accordingly, the first roller 210 may rotate in the R2 direction, and the second roller 220 may rotate in the R1 direction, so that the clothing C disposed therebetween moves downward again by changing its moving direction.

As described above, when it is confirmed that the clothing C passes through the upward region U or the downward region D based on sensing results of the sensors 270, the processor 600 may control the driving device 260 to change the rotation directions of the first and second rollers 210 and 220.

In addition, the processor 600 may control the driving device 260 to repeatedly move the clothing C between the first and second rollers 210 and 220 a predetermined number of times, when the clothing C is placed on the first and second rollers 210 and 220.

The number of times the clothing C repeatedly moves between the first and second rollers 210 and 220 may be an odd number of times. For example, in a case where the clothing C moves repeatedly three times, the clothing C may move downward, upward, and downward sequentially between the first and second rollers 210 and 220. Accordingly, an initial grip point of the clothing C may be induced on the upper sides of the first and second rollers 210 and 220.

Meanwhile, in a case where a plurality of pieces of clothing C are dropped onto the upper sides of the first and second rollers 210 and 220 in a tangled state, as the first and second rollers are driven, only one piece of the clothing C may be left between the first and second rollers 210 and 220, and the other pieces of the clothing C may be drop downward of the first and second rollers 210 and 220 and move to a predetermined point along with the moving device 300.

Figure 6D:
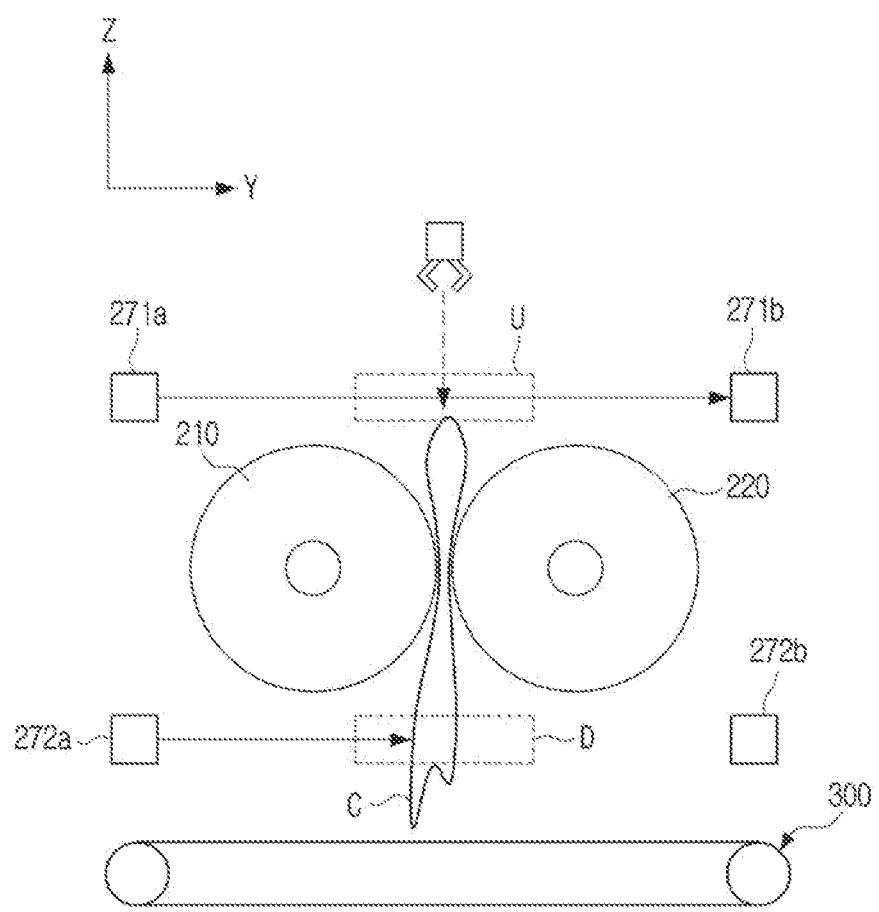
Figure 6E:
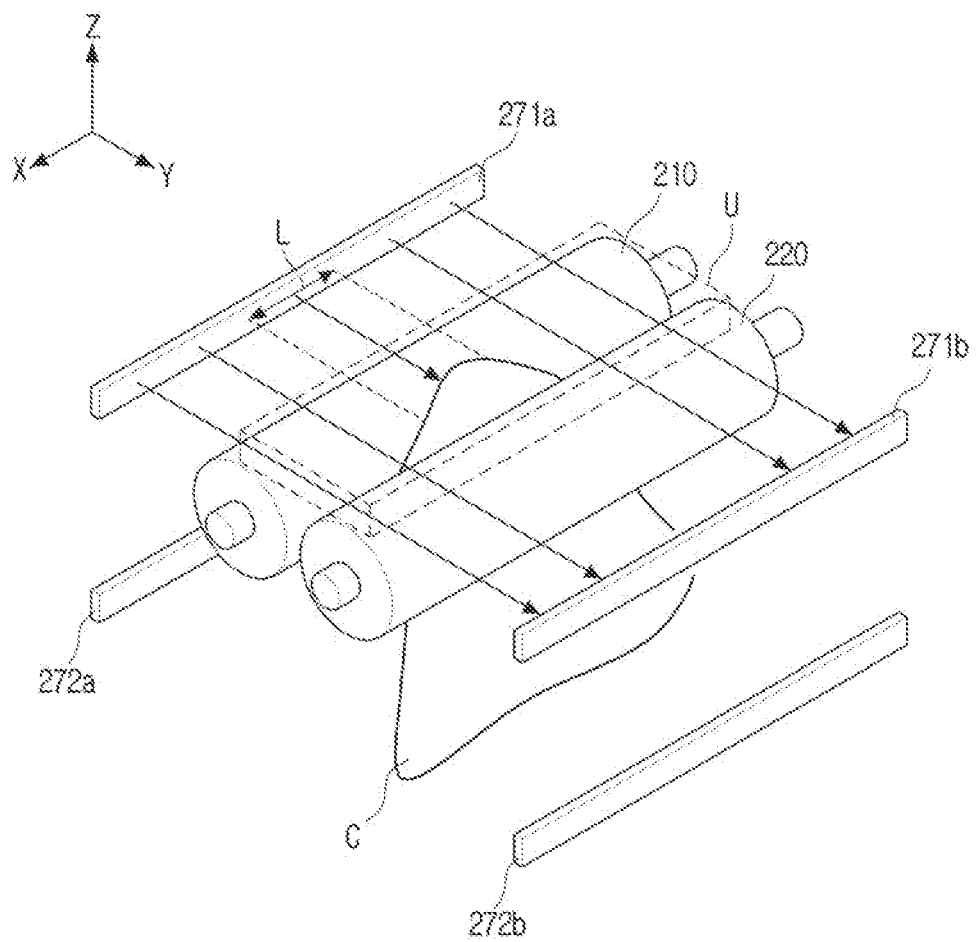

Referring to FIGS. 6D and 6E, after the clothing C repeatedly moves between the first and second rollers 210 and 220 the predetermined number of times, the processor 600 may control the grip device 100 to grip an uppermost region of the clothing C at a position where the sensor 270 detects the clothing C in the upward region U.

Accordingly, the grip device 100 may quickly grip an initial grip point of the clothing C. The initial grip point that varies depending on the type of clothing will be described in detail below.

In addition, after the clothing C repeatedly moves between the first and second rollers 210 and 220 the predetermined number of times, when it is determined that the clothing C occupies the upward region U in excess of a predetermined area, the processor 600 may control the driving device 260 to drop the clothing C downward of the first and second rollers 210 and 220.

For example, when a length A of the clothing C detected by the sensors 270 along an axial direction of the first and second rollers 210 and 220 (a direction parallel to the X-axis) exceeds a predetermined value, the processor 600 may determine that the clothing C occupies the upward region U in excess of the predetermined area, and control the driving device 260 to drop the clothing C downward of the first and second rollers 210 and 220. However, the algorithm of the processor 600 is not limited thereto.

In addition, when the sensor 270 detects the clothing C in a plurality of sections spaced apart from each other of the upward region U, the processor 600 may also control the driving device 260 to drop the clothing C downward of the first and second rollers 210 and 220.

Accordingly, the clothing that has dropped downward of the first and second rollers 210 and 220 is moved to the predetermined point by the moving device 300. Therefore, even if an initial grip point of the clothing C is not induced, the grip device 100 may grip the clothing C again and drop the clothing C on the upper sides of the first and second rollers 210 and 220 again.

FIGS. 7 to 10 are views illustrating aspects in which the sensor is implemented in various structures.

Figure 7:
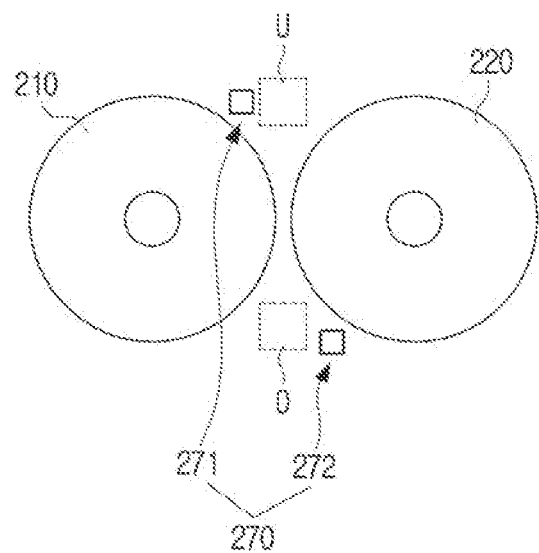
FIGS. 7 to 10 are views illustrating aspects in which the sensor is implemented in various structures.

Referring to FIG. 7, the sensor 270 may have an integrated light sensor structure in which a light emitting unit and a light receiving unit are integrally formed together, rather than being disposed independently while being spaced apart from each other.

Both the light emitting unit and the light receiving unit of each of the first and second sensors 271 and 272 may be disposed on one side with respect to a vertical axis passing between the first and second rollers 210 and 220. For example, the first sensor 271 may be disposed on the left side with respect to the vertical axis passing between the first and second rollers 210 and 220, and the second sensor 272 may be disposed on the right side with respect to the vertical axis passing between the first and second rollers 210 and 220. However, the first and second sensors 271 and 272 are not limited thereto, and it is sufficient if the light emitting unit and the light receiving unit of each of the first and second sensors 271 and 272 are integrally formed and disposed together on one side with respect to the vertical axis passing the first and second rollers 210 and 220.

The light receiving units of the first and second sensors 271 and 272 may receive light emitted from the corresponding light emitting units and reflected by clothing.

When light emitted from the light emitting unit of the first sensor 271 is reflected by clothing and the light receiving unit corresponding to the light emitting unit receives the reflected light, the processor 600 may determine that the clothing is located in the upward region U.

In addition, when light emitted from the light emitting unit of the second sensor 272 is reflected by clothing and the light receiving unit corresponding to the light emitting unit receives the reflected light, the processor 600 may determine that the clothing is located in the downward region D.

That is, the sensor 270 in which the light emitting unit and the light receiving unit are integrally formed may be implemented in a simpler structure than the sensor in which the light emitting unit and the light receiving unit are disposed independently while being spaced apart from each other.

In addition, the sensor 270 may be disposed adjacent to a gap between the first and second rollers 210 and 220. Accordingly, the sensor 270 may accurately detect a location of clothing moving upward and downward at a closer distance.

Figure 8:
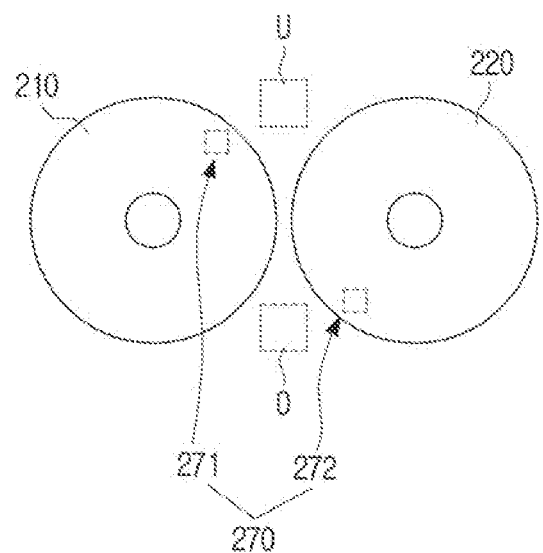
Figure 9:
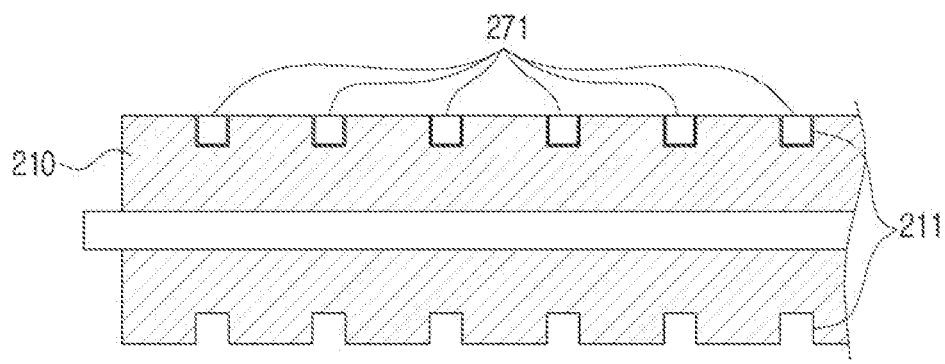
Figure 10:
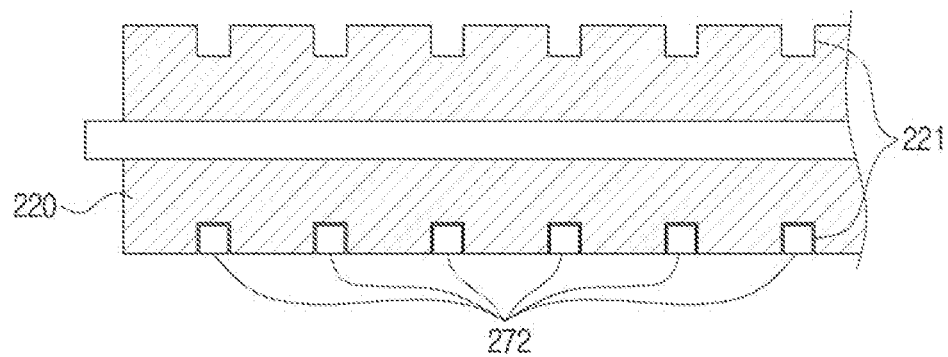

Referring to FIGS. 8 to 10, the first and second rollers 210 and 220 may have first grooves 211 and second grooves 221 formed inward from their side surfaces, respectively, by a predetermined depth along a circumferential direction. In addition, the first and second sensors 271 and 272 may be disposed in the first and second grooves 211 and 221, respectively.

The first and second grooves 211 and 221 may be formed at predetermined intervals along the length direction of the first and second rollers 210 and 220, respectively.

The first and second sensors 271 and 272 may be disposed not to contact the first and second rollers 210 and 220, respectively. Accordingly, the first and second sensors 271 and 272 may stably detect a location of the clothing in a fixed state at predetermined positions, without colliding with the rotating first and second rollers 210 and 220.

Each of the first and second sensors 271 and 272 may be implemented by an integrated light sensor in which a light emitting unit and a light receiving unit are integrally formed together.

For example, the first roller 210 may include a plurality of first grooves 211, and the first sensor 271 may be disposed in an upper-side one of the first grooves 211 to detect a location of clothing in the upward region U. The second roller 220 may include a plurality of second grooves 221, and the second sensor 272 may be disposed in a lower-side one of the second grooves 221 to detect a location of clothing in the downward region D.

Because the first and second sensors 271 and 272 are disposed in the first and second grooves 211 and 221, respectively, the first and second sensors 271 and 272 may more accurately detect a location of clothing at positions closest to the clothing, and stably detect a location of clothing at fixed positions without colliding with the clothing moving upward and downward.

FIGS. 11A to 11G are views for explaining a process in which a short-sleeved top is placed in a predetermined shape on the folding device.

Figure 11A:
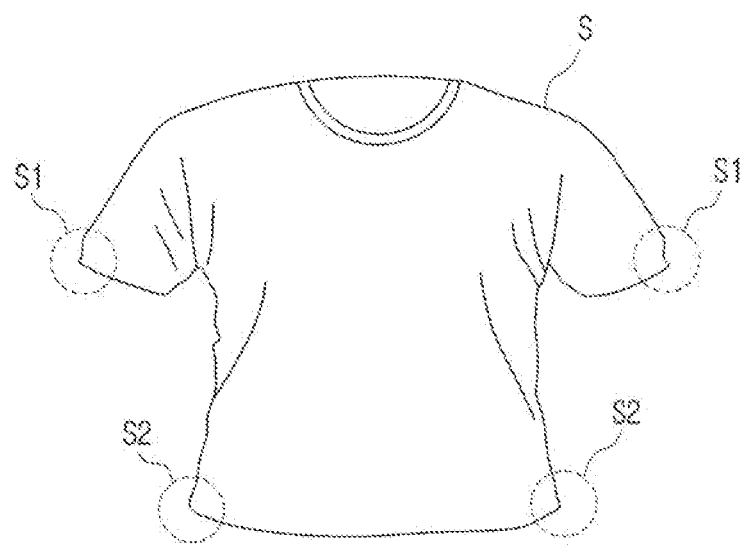
FIGS. 11A to 11G are views for explaining a process in which a short-sleeved top is placed in a predetermined shape on a folding device.
Figure 11B:
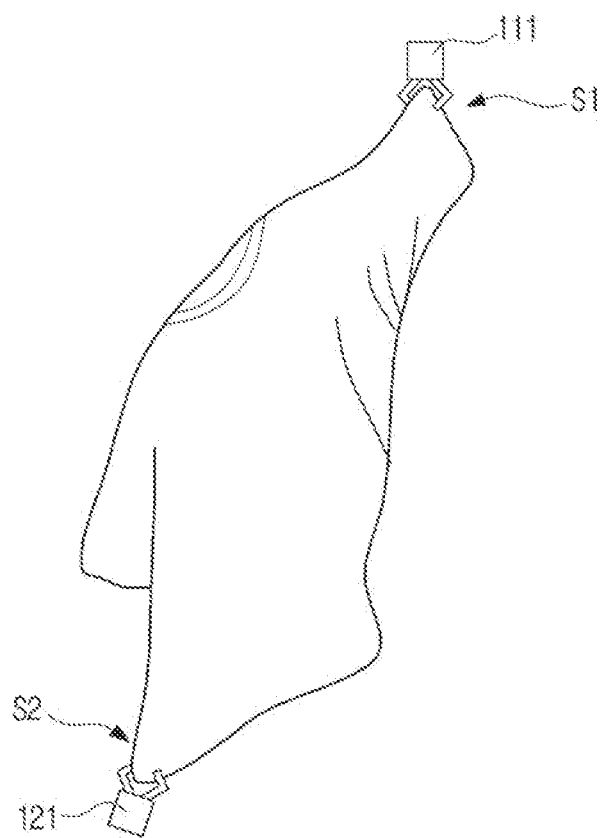

Referring to FIGS. 11A and 11B, a sleeve region S1 or a bottom hem region S2 of the short-sleeved top S may be led as an initial grip point by the clothing classification apparatus 200. Thereafter, the sleeve region S1 of the short-sleeved top S classified by the clothing classification apparatus 200 may be gripped by the first gripper 111, and when the first gripper 111 moves upward, the short-sleeved top S may sag down long due to gravity.

At this time, the second gripper 121 may grip the bottom hem region S2, which is a lowermost region, of the clothing gripped by the first gripper 111. Meanwhile, one region of the clothing gripped by each of the first and second grippers 111 and 121 is not limited thereto, and the regions gripped by the first and second grippers 111 and 121 may be reverse.

Figure 11C:
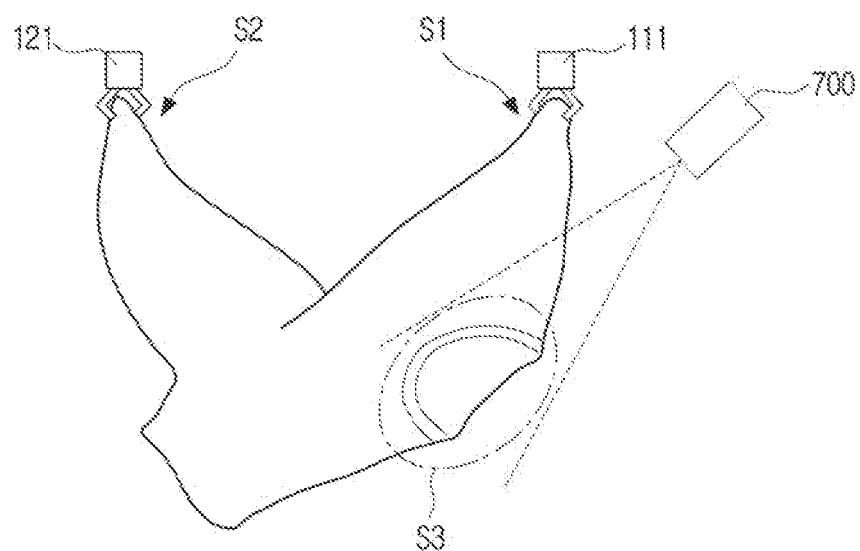

Referring to FIG. 11C, when the second gripper 121 moves to be disposed horizontally with respect to the first gripper 111 and the clothing spreads, the camera 700 may easily capture an image of a predetermined region of the clothing. The predetermined region of the short-sleeved top S may be a neck line S3, but is not limited thereto.

Meanwhile, when the predetermined region of the gripped clothing is not identified based on the image captured by the camera 700, the processor 600 may control the grip device 100 to move the gripped clothing to the predetermined point in the clothing organizing apparatus 1.

Figure 11D:
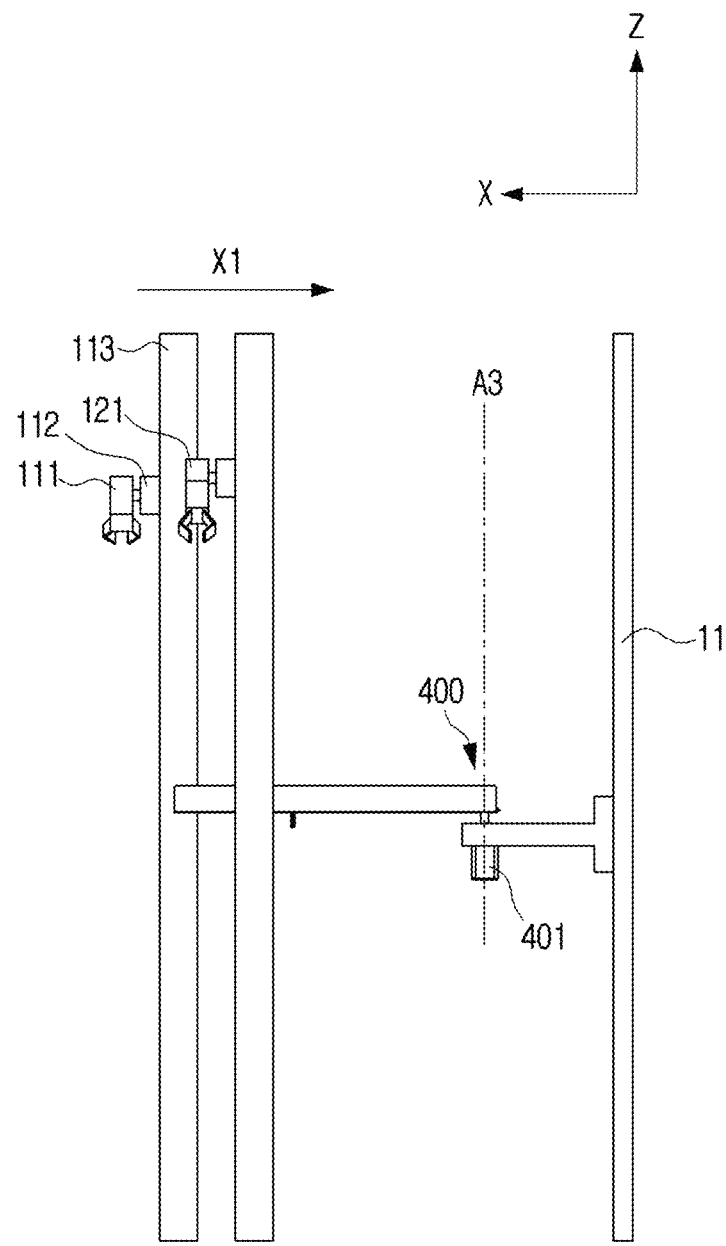
Figure 11E:
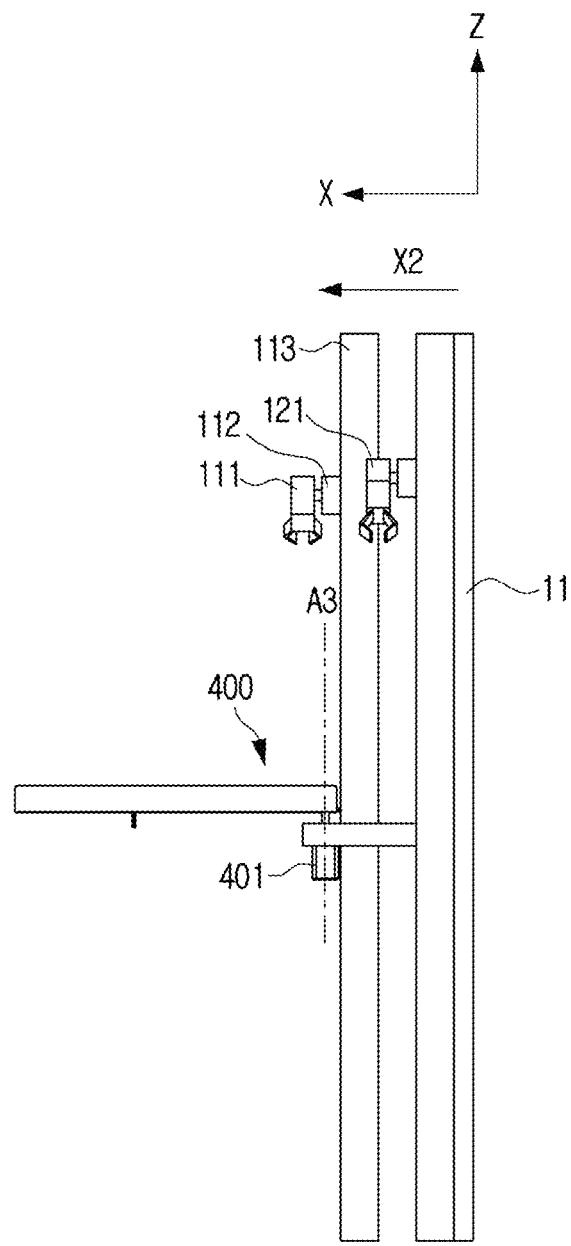

Referring to FIGS. 11D and 11E, the processor 600 may determine whether the clothing in the image captured by the camera 700 is shown as its front side or back side, and depending on a determination result, decide moving directions of the first and second grippers 111 and 121 to place the clothing on the folding device 400 in a state where the front side of the clothing faces upward.

Specifically, when it is determined that the clothing in the image captured by the camera 700 is shown as its front side, as illustrated in FIG. 11D, the processor 600 may control the grip device 100 to drop the clothing onto the folding device 400 by moving the first and second grippers 111 and 121 in an X1 direction. Conversely, when it is determined that the clothing in the image captured by the camera 700 is shown as its back side, as illustrated in FIG. 11E, the processor may control the grip device 100 to drop the clothing onto the folding device 400 by moving the first and second grippers 111 and 121 in an X2 direction.

Accordingly, regardless of whether the clothing in the image captured by the camera 700 is shown as its front side or back side, the clothing may be placed on the folding device 400 in a state where its front side thereof faces upward.

Thereafter, the folding device 400 may be rotated about an A3 axis along the horizontal plane by a motor 401 to align the predetermined regions of the clothing in parallel to the rotation directions of the first and second grippers 111 and 121, such that the first and second grippers 111 and 121 easily grip the predetermined regions of the clothing.

Figure 11F:
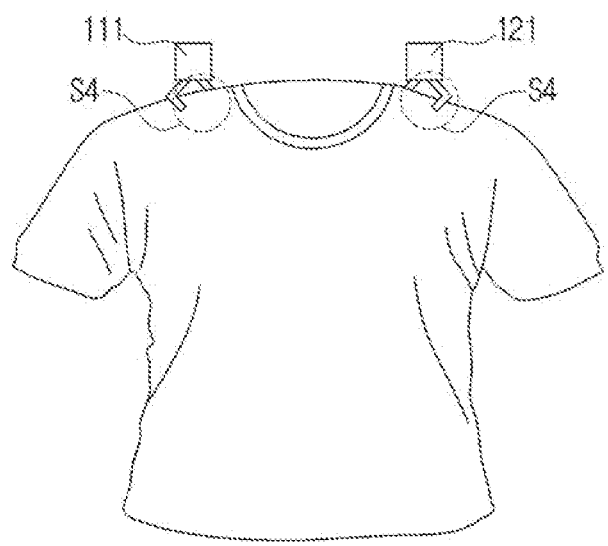
Figure 11G:
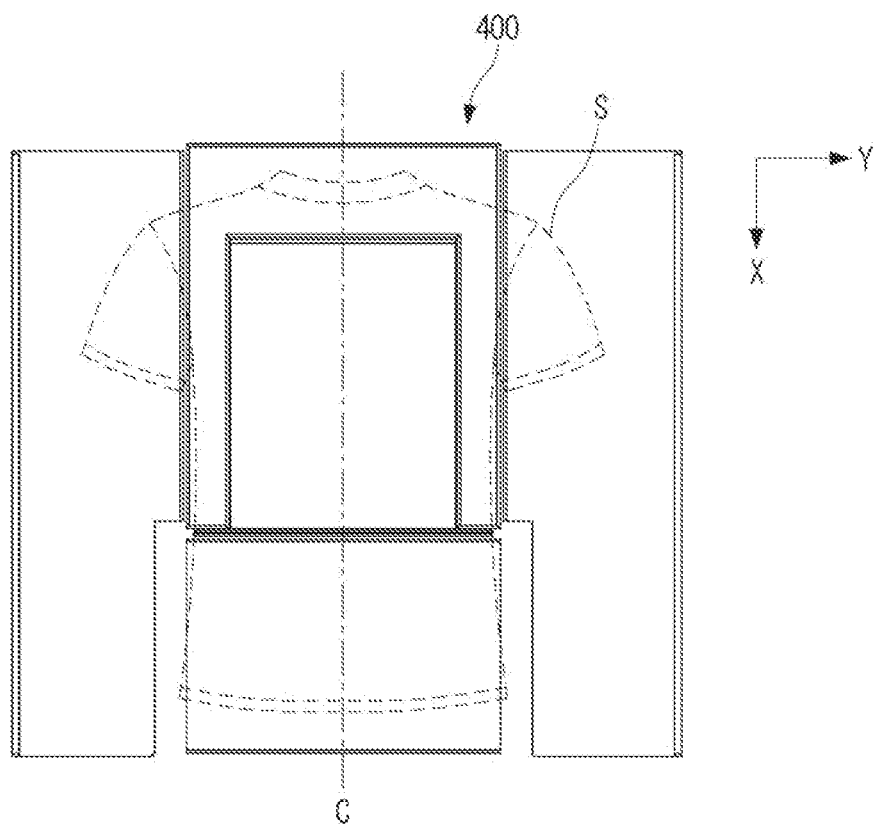

Referring to FIGS. 11F and 11G, the processor 600 may control the grip device 100 to re-grip one region adjacent to the predetermined region of the clothing placed on the folding device 400, and place the re-gripped clothing on the folding device 400 in the predetermined shape.

The clothing may be finally placed on the folding device 400 by the grip device 100 in a state where its back side faces upward. Specifically, the first and second grippers 111 and 121 may rotate the re-gripped clothing by moving to cross each other, and then place the re-gripped clothing in a state where the back surface thereof faces upward.

That is, after the clothing is primarily placed on the folding device 400 by the grip device 100 in a state where the predetermined region (e.g., a neck line of the top) of the clothing faces upward, one region adjacent to the predetermined region (e.g., a shoulder region of the top) of the clothing may be re-gripped, and the clothing may be secondarily placed on the folding device 400 in a state where its back side faces upward.

As will be described below, the clothing may be rotated so that its front side faces upward by the operation of the folding device 400, and then placed on the discharge plate. For example, in the case of the short-sleeved top S, the grip device 100 may re-grip a shoulder region S4 of the short-sleeved top S, and drop the re-gripped short-sleeved top S onto the folding device to be disposed symmetrically with respect to a center line CL of the folding device 400 as illustrated in FIG. 11G. At this time, the short-sleeved top S may be placed on the folding device in a state where the back surface thereof faces upward.

FIGS. 12A to 12D are views for explaining a process in which a long-sleeved top is placed in a predetermined shape on the folding device.

Referring to FIGS. 12A to 12D, sleeve regions L1 of a long-sleeved top L may be led as initial grip points by the clothing classification apparatus 200. Thereafter, when the long-sleeved top L spreads in a state where both sleeve regions L1 are gripped by the first and second grippers 111 and 121, the camera 700 may easily capture an image of a neck line L2 of the long-sleeved top L.

As in the case of the short-sleeved top S described above, the grip device 100 may drop the long-sleeved top L onto the folding device in a state where the neck line L2 of the long-sleeved top L faces upward, and re-grip shoulder regions L3 of the long-sleeved top L.

Figure 12A:
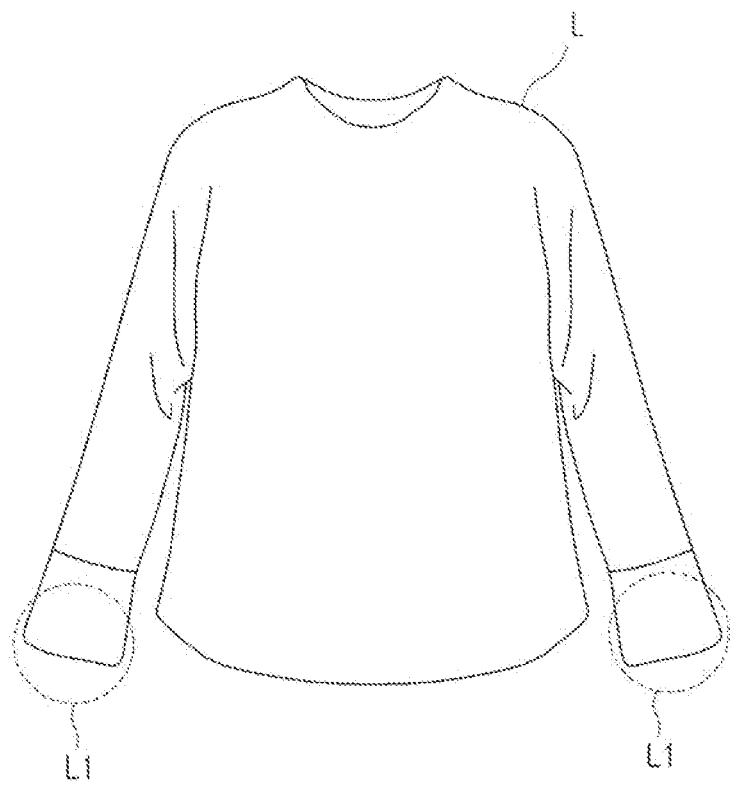
FIGS. 12A to 12D are views for explaining a process in which a long-sleeved top is placed in a predetermined shape on the folding device.
Figure 12B:
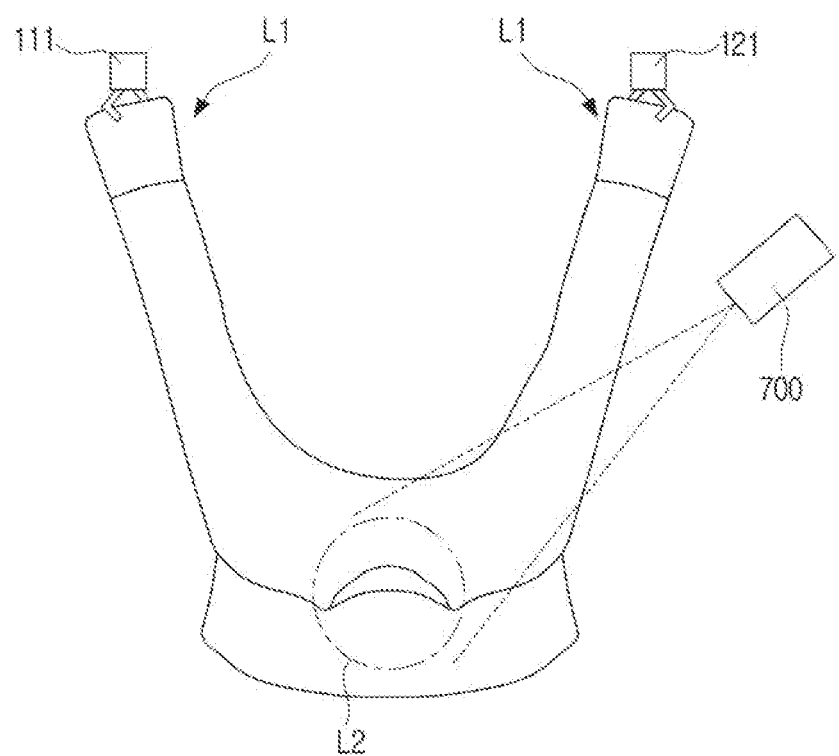
Figure 12C:
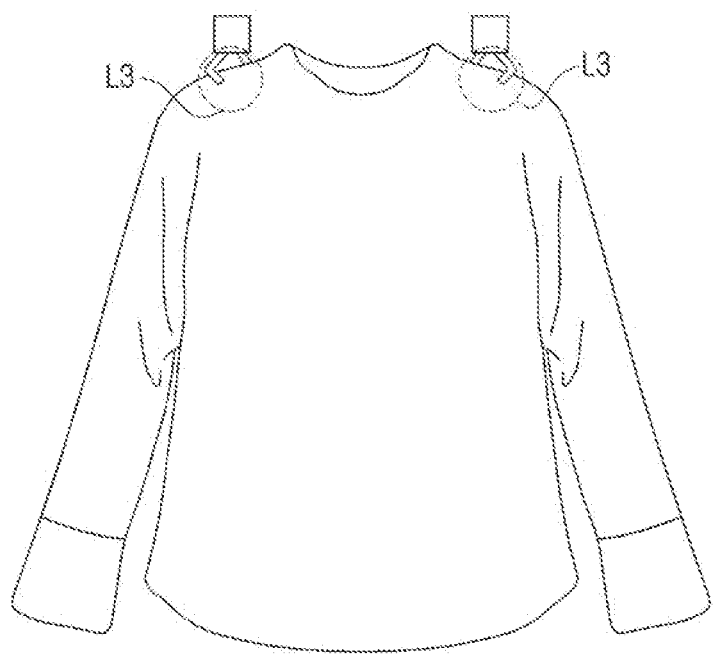
Figure 12D:
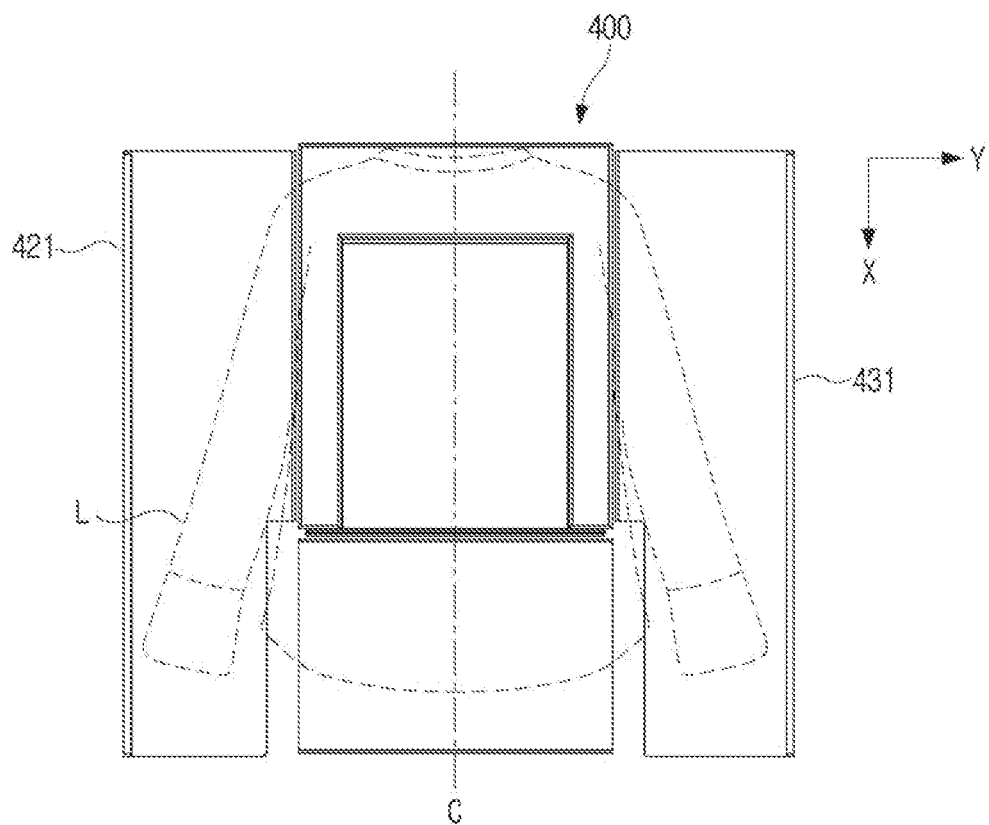

The re-gripped long-sleeved top L may be dropped onto the folding device 400 by the grip device 100 to be disposed symmetrically with respect to the center line CL of the folding device 400 in a state where its back side faces upward, as illustrated in FIG. 12D.

At this time, the sleeve regions of the long-sleeved top L may be stably placed on the folding device 400 by flanges 421 and 431, which will be described below, without slipping downward of the folding device 400.

FIGS. 13A to 13D are views for explaining a process in which pants is displayed in a predetermined shape on the folding device.

Referring to FIGS. 13A to 13D, bottom hem regions P1 of pants P may be led as initial grip points by the clothing classification apparatus 200. Then, when the pants P spreads in a state where both bottom hem regions P1 are gripped by the first and second grippers 111 and 121, the camera 700 may easily capture an image of a zipper line P2 of the pants P.

Figure 13A:
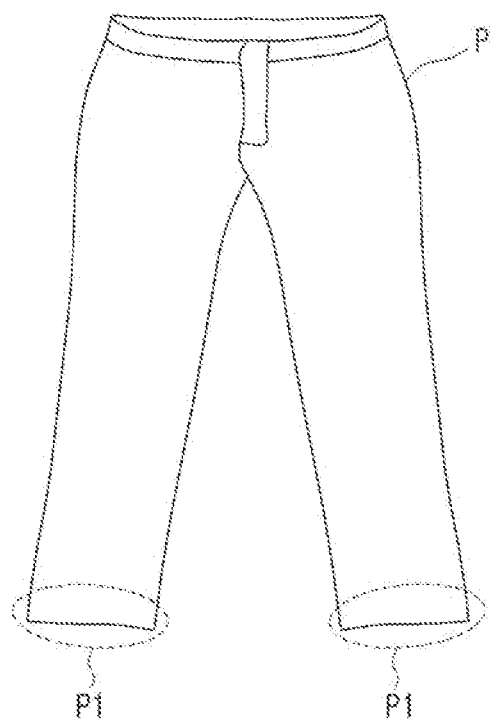
FIGS. 13A to 13D are views for explaining a process in which pants is displayed in a predetermined shape on the folding device.
Figure 13B:
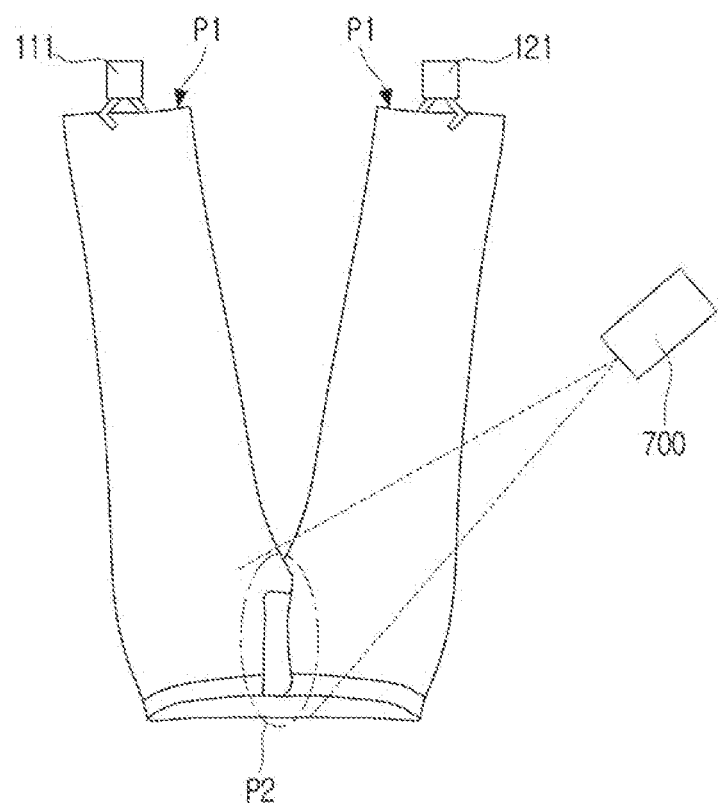
Figure 13C:
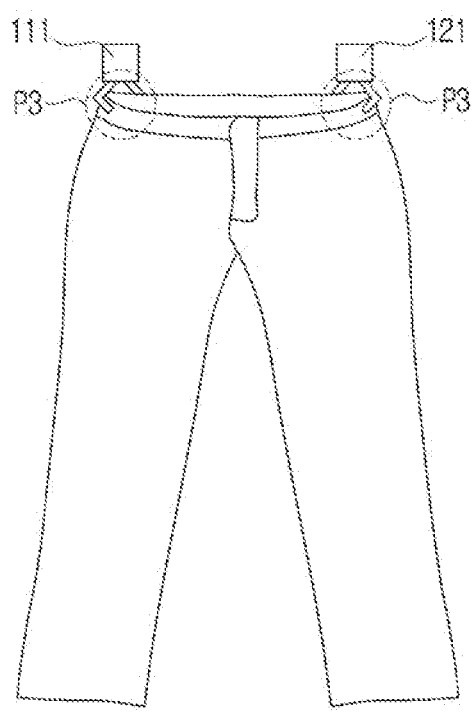
Figure 13D:
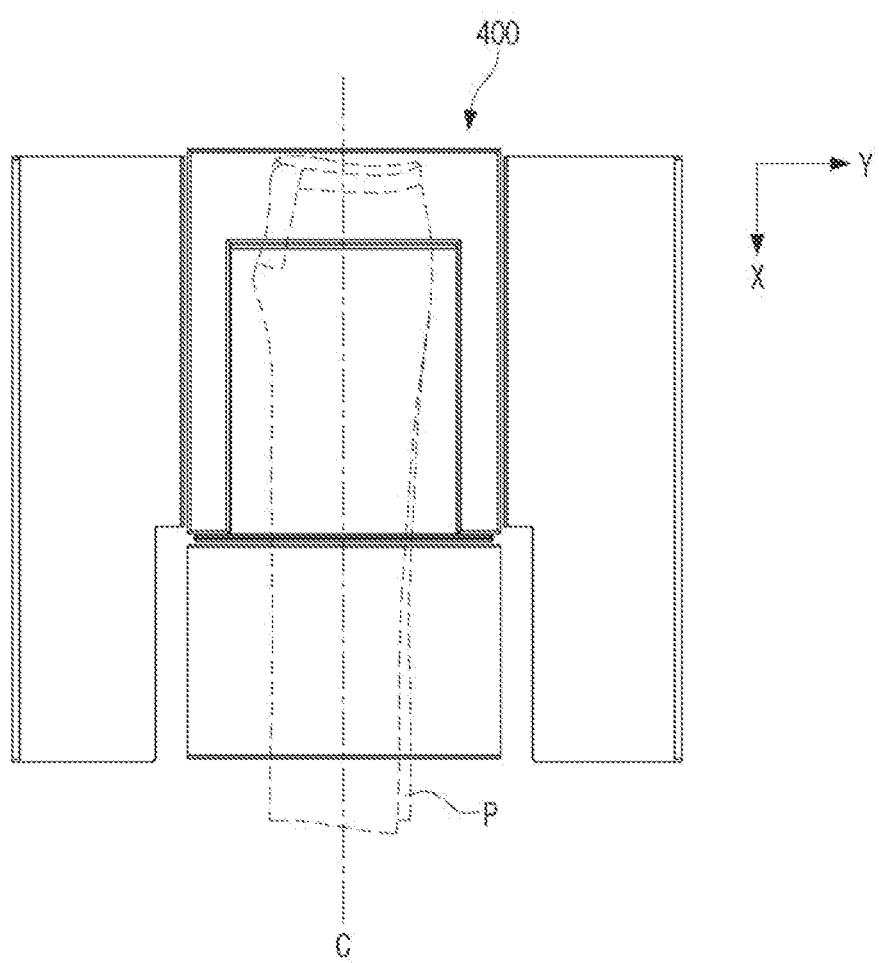

Thereafter, the grip device 100 may drop the pants P onto the folding device 400 in a state where the zipper line P2 of the pants P faces upward, re-grip belt regions P3 of the pants P, move so that the first and second grippers 111 and 121 cross each other, and drop the gripped pants P onto the folding device 400 in a half-folded state as illustrated in FIG. 13D.

Figure 14:
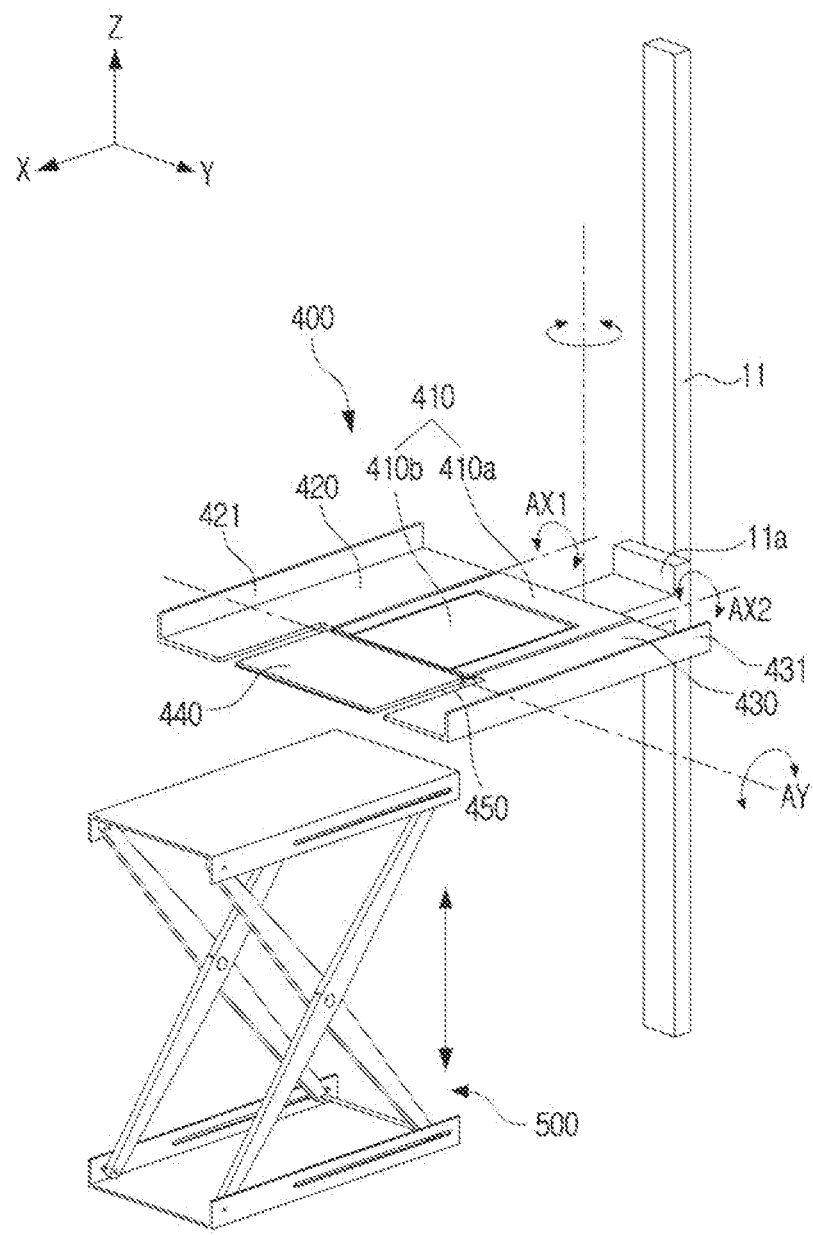
FIG. 14 is a perspective view illustrating a folding device and a discharge plate according to an embodiment of the disclosure.

FIG. 14 is a perspective view illustrating the folding device and the discharge plate according to an embodiment of the disclosure.

Referring to FIG. 14, the folding device 400 may include a main plate 410 disposed horizontally, a first folding plate 420 rotatably connected to a left side of the main plate 410, a second folding plate 430 rotatably connected to a right side of the main plate 410, and a third folding plate 440 rotatably connected to a front side of the main plate 410.

The first and second folding plates 420 and 430 may fold sleeve regions of a top by rotating about AX1 and AX2 axes, respectively, toward the main plate 410. In addition, the third folding plate 440 may fold clothing in the horizontal direction by rotating about an AY axis toward the main plate 410.

In addition, the first folding plate 420 may include a first flange 421 whose left end is bent upward, and the second folding plate 430 may include a second flange 431 whose right end is bent upward. Accordingly, as described above, sleeve regions of a long-sleeved top may be stably placed on the folding device 400 without slipping downward of the folding device 400.

In addition, the main plate 410 may have a fixed region 410a and a rotatable region 410b rotatably connected to the fixed region 410a. Specifically, the rotatable region 410b of the main plate 410 may move folded clothing to an upper surface of the discharge plate 500 by rotating about the AY axis toward the discharge plate 500.

That is, when it is determined that the folding of the clothing is completed, the processor 600 may control the folding device 400 to rotate the rotatable region 410b toward the discharge plate 500.

FIGS. 15A to 15D are views for explaining a process in which clothing is folded by the folding device. A process in which the short-sleeved top S is folded by the folding device 400 will be described in detail with reference to FIGS. 15A to 15D.

Figure 15A:
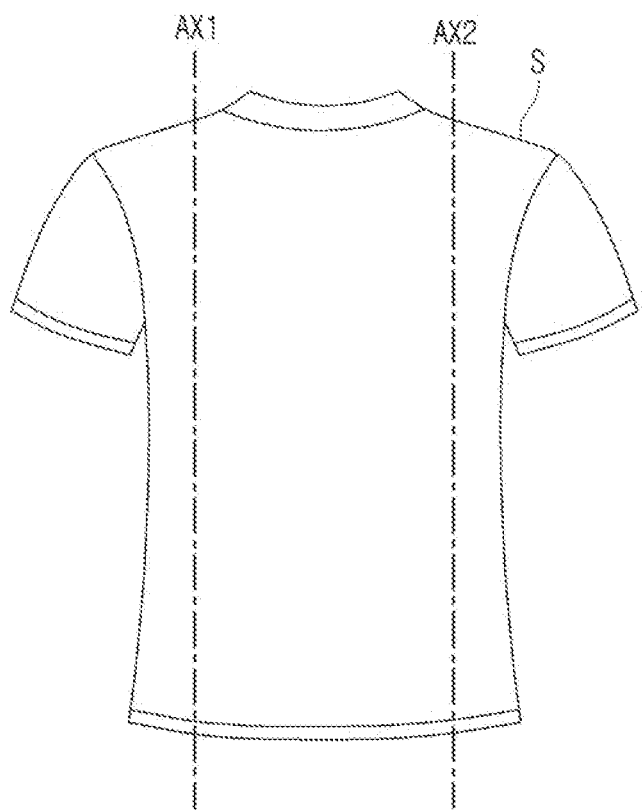
FIGS. 15A to 15D are views for explaining a process in which clothing is folded by the folding device.

Referring to FIG. 15A, the short-sleeved top S may be placed on the folding device 400 in a state where its back side faces upward. Thereafter, the first and second folding plates 420 and 430 may rotate about the AX1 and AX2 axes, respectively, toward the main plate 410. Accordingly, both sleeves of the short-sleeved top S may be folded toward a body portion.

Figure 15B:
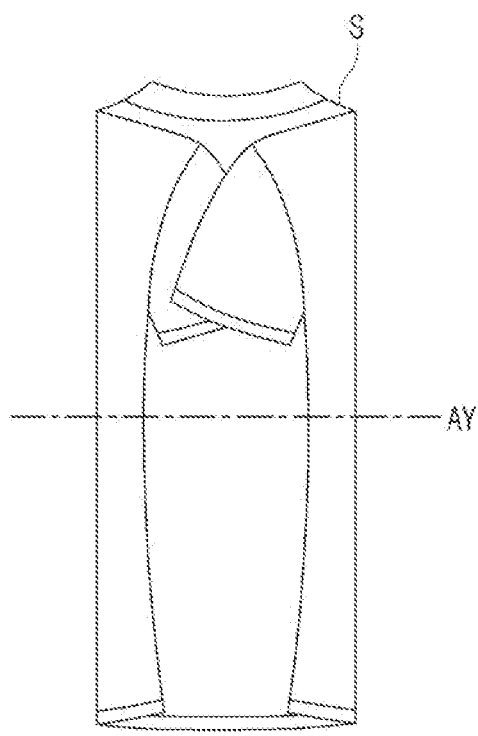

Referring to FIG. 15B, the third folding plate 440 may rotate about the AY axis toward the main plate 410. Accordingly, the short-sleeved top S may be folded in the horizontal direction. Then, the folding of the short-sleeved top S may be completed in a substantially rectangular shape.

Figure 15C:
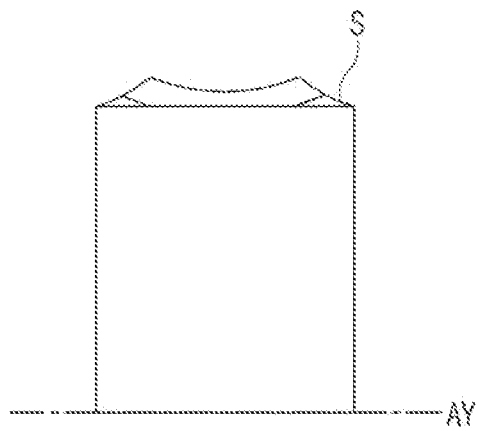
Figure 15D:
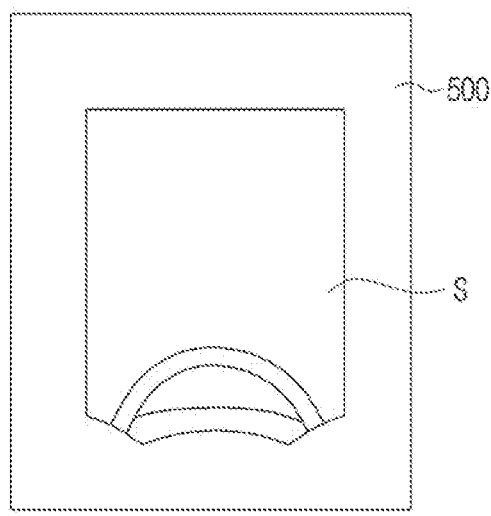

Referring to FIGS. 15C and 15D, in a state in which the folded short-sleeved top S is placed on the main plate 410, the rotatable region 410b may rotate about the AY axis toward the discharge plate 500. Accordingly, the short-sleeved top S may be finally placed on the discharge plate 500 in a state where its front side faces upward.

Figure 16:
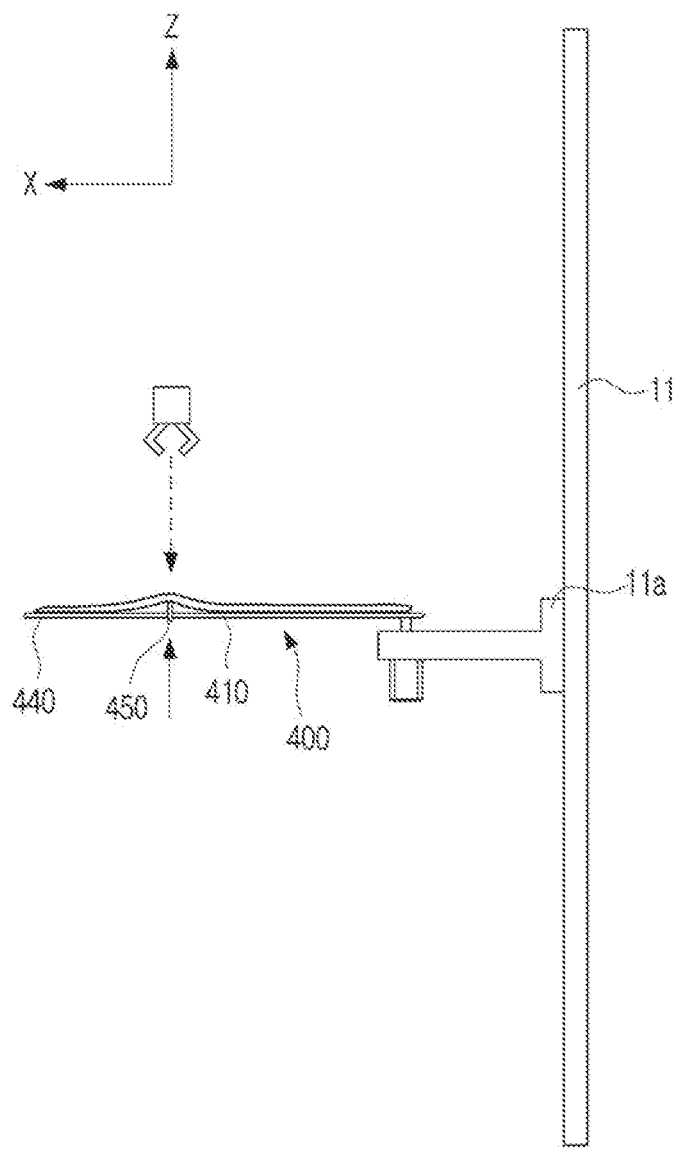
FIG. 16 is a side view of the folding device illustrating a state in which an auxiliary plate moves upward.

FIG. 16 is a side view of the folding device illustrating a state in which an auxiliary plate moves upward.

Referring to FIG. 16, the folding device 400 may further include an auxiliary plate 450 connected to the main plate 410 to be movable upward or downward. When it is determined that clothing gripped by the grip device 100 exceeds a predetermined length based on an image captured by the camera 700, the processor 600 may control the folding device 400 to move the auxiliary plate 450 to be higher than the main plate 410.

Accordingly, as illustrated in FIG. 16, in the case of clothing having a long length such as pants or towels, after the auxiliary plate 450 moves to be higher than the main plate 410, the grip device 100 may grip one region protruding upward through the auxiliary plate 450 and drop the clothing onto the folding device 400 again, thereby making it possible to easily fold the clothing having a long length in the horizontal direction.

Although certain embodiments of the disclosure have been illustrated and described above, the disclosure is not limited to these embodiments as described above, and may be variously modified by any person skilled in the art to which the disclosure pertains without departing from the spirit of the disclosure as claimed in the appended claims. Such modifications fall within the scope of the claims.

What is claimed is:

1. A clothing organizing apparatus comprising:
   at least one grip device configured to grip and move a piece of clothing;
   a clothing classification apparatus comprising a first roller and a second roller facing the first roller, the first roller and the second roller being configured to move the piece of clothing upward and downward between the first roller and the second roller;
   a folding device comprising a plurality of rotatable plates configured to fold the piece of clothing;
   memory storing one or more instructions; and
   at least one processor configured to execute the one or more instructions, wherein the one or more instructions, when executed by the at least one processor, cause the clothing organizing apparatus to:
   control the at least one grip device to move the piece of clothing to the clothing classification apparatus,
   control the clothing classification apparatus to classify the piece of clothing moved to the clothing classification apparatus,
   control the at least one grip device to move the piece of clothing classified by the clothing classification apparatus to the folding device, and
   control the folding device to fold the piece of clothing placed on the folding device.

2. The clothing organizing apparatus of claim 1, wherein the at least one grip device comprises a first grip device and a second grip device that are configured to grip different regions of the piece of clothing, and
   wherein the one or more instructions, when executed by the at least one processor, cause the clothing organizing apparatus to, based on the first grip device gripping the piece of clothing classified by the clothing classification apparatus, control the second grip device to grip a lowermost region of the piece of clothing gripped by the first grip device.

3. The clothing organizing apparatus of claim 2, further comprising a camera configured to capture an image of the piece of clothing gripped by the first grip device and the second grip device.

4. The clothing organizing apparatus of claim 3, wherein the one or more instructions, when executed by the at least one processor, cause the clothing organizing apparatus to:
- identify a predetermined region of the piece of clothing gripped by at least one of the first grip device and the second grip device, based on the image captured by the camera, and
- control at least one of the first grip device and the second grip device to place the predetermined region of the piece of clothing at a predetermined position of the folding device.

5. The clothing organizing apparatus of claim 4, wherein the one or more instructions, when executed by the at least one processor, cause the clothing organizing apparatus:
- control at least one of the first grip device and the second grip device to re-grip a region of the piece of clothing adjacent to the predetermined region of the piece of clothing placed on the folding device, and
- place the re-gripped piece of clothing in a predetermined shape on the folding device.

6. The clothing organizing apparatus of claim 4, wherein the one or more instructions, when executed by the at least one processor, cause the clothing organizing apparatus to, based on not identifying the predetermined region of the gripped clothing based on the image captured by the camera, control at least one of the first grip device and the second grip device to move the gripped clothing to a predetermined point in the clothing organizing apparatus.

7. The clothing organizing apparatus of claim 1, wherein the plurality of rotatable plates comprise:
- a main plate disposed horizontally;
- a first folding plate rotatably connected to a left side of the main plate;
- a second folding plate rotatably connected to a right side of the main plate; and
- a third folding plate rotatably connected to a front side of the main plate.

8. The clothing organizing apparatus of claim 7, wherein the first folding plate is bent upward at a left end thereof, and the second folding plate is bent upward at a right end thereof.

9. The clothing organizing apparatus of claim 7, further comprising a guide rail disposed vertically within the clothing organizing apparatus,
wherein the main plate is rotatably connected to the guide rail on a horizontal plane.

10. The clothing organizing apparatus of claim 7, wherein the folding device further comprises an auxiliary plate connected to the main plate and configured to be movable upward or downward.

* * * * *